US011159258B2

(12) United States Patent
Kovach

(10) Patent No.: US 11,159,258 B2
(45) Date of Patent: Oct. 26, 2021

(54) PATTERN AND DELAY RECOVERY WITH HIGHER-ORDER SPECTRA

(71) Applicant: UNIVERSITY OF IOWA RESEARCH FOUNDATION, Iowa City, IA (US)

(72) Inventor: Christopher K. Kovach, Iowa City, IA (US)

(73) Assignee: University of Iowa Research Foundation, Iowa City, IA (US)

(*) Notice: Subject to any disclaimer, the term of this patent is extended or adjusted under 35 U.S.C. 154(b) by 0 days.

(21) Appl. No.: 17/058,727

(22) PCT Filed: Jul. 3, 2019

(86) PCT No.: PCT/IB2019/055678
§ 371 (c)(1),
(2) Date: Nov. 25, 2020

(87) PCT Pub. No.: WO2020/012298
PCT Pub. Date: Jan. 16, 2020

(65) Prior Publication Data
US 2021/0218485 A1    Jul. 15, 2021

Related U.S. Application Data

(60) Provisional application No. 62/695,586, filed on Jul. 9, 2018.

(51) Int. Cl.
*H04B 3/46* (2015.01)
*H04B 17/364* (2015.01)
(Continued)

(52) U.S. Cl.
CPC ......... *H04B 17/364* (2015.01); *H04B 7/0842* (2013.01); *H04B 17/318* (2015.01); *H04B 17/336* (2015.01)

(58) Field of Classification Search
CPC .. H04B 17/364; H04B 7/0842; H04B 17/336; H04B 17/318
(Continued)

(56) References Cited

U.S. PATENT DOCUMENTS 6,850,557 B1    2/2005  Gronemeyer
9,240,815 B1    1/2016  Wyse
(Continued)

OTHER PUBLICATIONS

C. Kovach, M. Howard, III, "Decomposition of Higher-order Spectra for Blind Multiple-input Deconvolution, Pattern Identification and Separation," Signal Processing, vol. 165, pp. 357-379, 2019.
(Continued)

*Primary Examiner* — Don N Vo
(74) *Attorney, Agent, or Firm* — Miles & Stockbridge P.C.; Ajay A. Jagtiani

(57) ABSTRACT

The invention addresses the problem of recovering an unknown signal from multiple records of brief duration which are presumed to contain the signal at mutually random delays in a background of independent noise. The scenario is relevant to many applications, among which are the recovery of weak transients from large arrays of sensors and the identification of recurring patterns through a comparison of sequential intervals within a single record of longer duration. A simple and practical approach is provided by solving this problem through higher-order spectra. Applying the method to the third-order spectrum, the bispectrum, leads to filters derived from cross bicoherence.

20 Claims, 11 Drawing Sheets

(51) Int. Cl.
  *H04B 7/08* (2006.01)
  *H04B 17/336* (2015.01)
  *H04B 17/318* (2015.01)

(58) Field of Classification Search
  USPC ........................................ 375/224, 340, 342
  See application file for complete search history.

(56) References Cited

U.S. PATENT DOCUMENTS

| | | | | |
|---|---|---|---|---|
| 2006/0053005 | A1* | 3/2006 | Gulati | G01B 9/02084 704/226 |
| 2007/0254592 | A1* | 11/2007 | McCallister | H03F 3/24 455/67.11 |
| 2010/0228530 | A1* | 9/2010 | Valero | E21B 43/26 703/2 |
| 2011/0171920 | A1 | 7/2011 | Kim et al. | |
| 2013/0191035 | A1* | 7/2013 | Chon | A61B 5/7207 702/19 |
| 2015/0287422 | A1* | 10/2015 | Short | G01S 13/723 704/205 |
| 2017/0170854 | A1 | 6/2017 | Soualle et al. | |

OTHER PUBLICATIONS

G. C. Carter, "Coherence and time delay estimation," Proceedings of the IEEE, vol. 75, No. 2, pp. 236-255, 1987.

G. Turin, "An introduction to matched filters," IRE Transactions on Information Theory, vol. 6, No. 3, pp. 311-329, Jun. 1960.

C. D. Woody, "Characterization of an adaptive filter for the analysis of variable latency neuroelectric signals," Medical and biological engineering, vol. 5, No. 6, pp. 539-554, Nov. 1967. [Online]. Available: https://doi.org/10.1007/BF02474247 =0pt.

D. R. Brillinger, "An introduction to polyspectra," The Annals of mathematical statistics, pp. 1351-1374, 1965.

J. M. Mendel, "Tutorial on higher-order statistics (spectra) in signal processing and system theory: theoretical results and some applications," Proceedings of the IEEE, vol. 79, No. 3, pp. 278-305, Mar. 1991.

C. L. Nikias and J. Mendel, "Signal processing with higher-order spectra," IEEE signal processing magazine, vol. 10, No. 3, pp. 10-37, 1993.

M. J. Hinich and G. R. Wilson, "Time delay estimation using the cross bispectrum," IEEE Transactions on Signal Processing, vol. 40, No. 1, pp. 106-113, Jan. 1992.

C. L. Nikias and R. Pan, "Time delay estimation in unknown gaussian spatially correlated noise," IEEE Transactions on Acoustics, Speech, and Signal Processing, vol. 36, No. 11, pp. 1706-1714, 1988.

A. V. Totsky, A. A. Zelensky, and V. F. Kravchenko, Bispectral methods of signal processing: applications in Radar, telecommunications and digital image restoration. plus 0.5em minus 0.4emWalter de Gruyter GmbH & Co KG, 2015.

C. K. Kovach, H. Oya, and H. Kawasaki, "The bispectrum and its relationship to phase-amplitude coupling," NeuroImage, vol. 173, pp. 518-539, 2018. [Online]. Available: http://www.sciencedirect.com/science/article/pii/S1053811918301307 =0pt.

L. A. Pflug, G. E. Ioup, J. W. Ioup, K. H. Barnes, R. L. Field, and G. H. Rayborn, "Detection of oscillatory and impulsive transients using higher-order correlations and spectra," The Journal of the Acoustical Society of America, vol. 91, No. 5, pp. 2763-2776, 1992. [Online]. Available: https://doi.org/10.1121/1.402957 =0pt.

L. A. Pflug, G. E. Ioup, J. W. Ioup, R. L. Field, and J. H. Leclere, "Time-delay estimation for deterministic transients using second- and higher-order correlations," The Journal of the Acoustical Society of America, vol. 94, No. 3, pp. 1385-1399, 1993. [Online]. Available: https://doi.org/10.1121/1.408167 =0pt.

L. A. Pflug, G. E. Ioup, J. W. Ioup, and R. L. Field, "Prediction of signal-to-noise ratio gain for passive higher-order correlation detection of energy transients," The Journal of the Acoustical Society of America, vol. 98, No. 1, pp. 248-260, 1995. [Online]. Available: https://doi.org/10.1121/1.414332 =0pt.

R. A. Wiggins, "Minimum entropy deconvolution," Geoexploration, vol. 16, No. 1, pp. 21-35, 1978. [Online]. Available: http://www.sciencedirect.com/science/article/pii/0016714278900054 =0pt.

J. A. Cadzow, "Blind deconvolution via cumulant extrema," IEEE Signal Processing Magazine, vol. 13, No. 3, pp. 24-42, May 1996.

P. Paajarvi and J. P. LeBlanc, "Online adaptive blind deconvolution based on third-order moments," IEEE Signal Processing Letters, vol. 12, No. 12, pp. 863-866, Dec. 2005.

M. K. Broadhead, L. A. Pflug, and R. L. Field, "Use of higher order statistics in source signature estimation," The Journal of the Acoustical Society of America, vol. 107, No. 5, pp. 2576-2585, 2000. [Online]. Available: https://doi.org/10.1121/1.428645 =0pt.

X. Li and N. M. Bilgutay, "Wiener filter realization for target detection using group delay statistics," IEEE Transactions on Signal Processing, vol. 41, No. 6, pp. 2067-2074, Jun. 1993.

Y. C. Kim and E. J. Powers, "Digital bispectral analysis and its applications to nonlinear wave interactions," IEEE Transactions on Plasma Science, vol. 7, No. 2, pp. 120-131, Jun. 1979.

S. Hagihira, M. Takashina, T. Mori, T. Mashimo, and I. Yoshiya, "Practical issues in bispectral analysis of electroencephalographic signals," Anesthesia & Analgesia, vol. 93, No. 4, pp. 966-970, 2001.

C. K. Kovach, "A biased look at phase locking: Brief critical review and proposed remedy," IEEE Transactions on Signal Processing, vol. 65, No. 17, pp. 4468-4480, 2017.

D. L. Donoho and I. M. Johnnstone, "Ideal denoising in an orthonormal basis chosen from a library of bases," Comptes rendus de l'Académie des sciences. Série 1, Mathématique, vol. 319, No. 12, pp. 1317-1322, 1994.

B. Matthews, "Comparison of the predicted and observed secondary structure of t4 phage lysozyme," Biochimica et Biophysica Acta (BBA)—Protein Structure, vol. 405, No. 2, pp. 442-451, 1975. [Online]. Available: http://www.sciencedirect.com/science/article/pii/0005279575901099 =0pt.

A. L. Goldberger, L. A. N. Amaral, L. Glass, J. M. Hausdorff, P. C. Ivanov, R. G. Mark, J. E. Mietus, G. B. Moody, C.-K. Peng, and H. E. Stanley, "Physiobank, physiotoolkit, and physionet," Circulation, vol. 101, No. 23, pp. e215-e220, 2000. [Online]. Available: http://circ.ahajournals.org/content/101/23/e215 =0pt.

International Search Report in corresponding International Patent Application No. PCT/IB2019/055678 dated Dec. 17, 2019.

Written Opinion of the International Searching Authority in corresponding International Patent Application No. PCT/IB2019/055678 dated Dec. 17, 2019.

* cited by examiner

FIG. 2A　　　　FIG. 2B

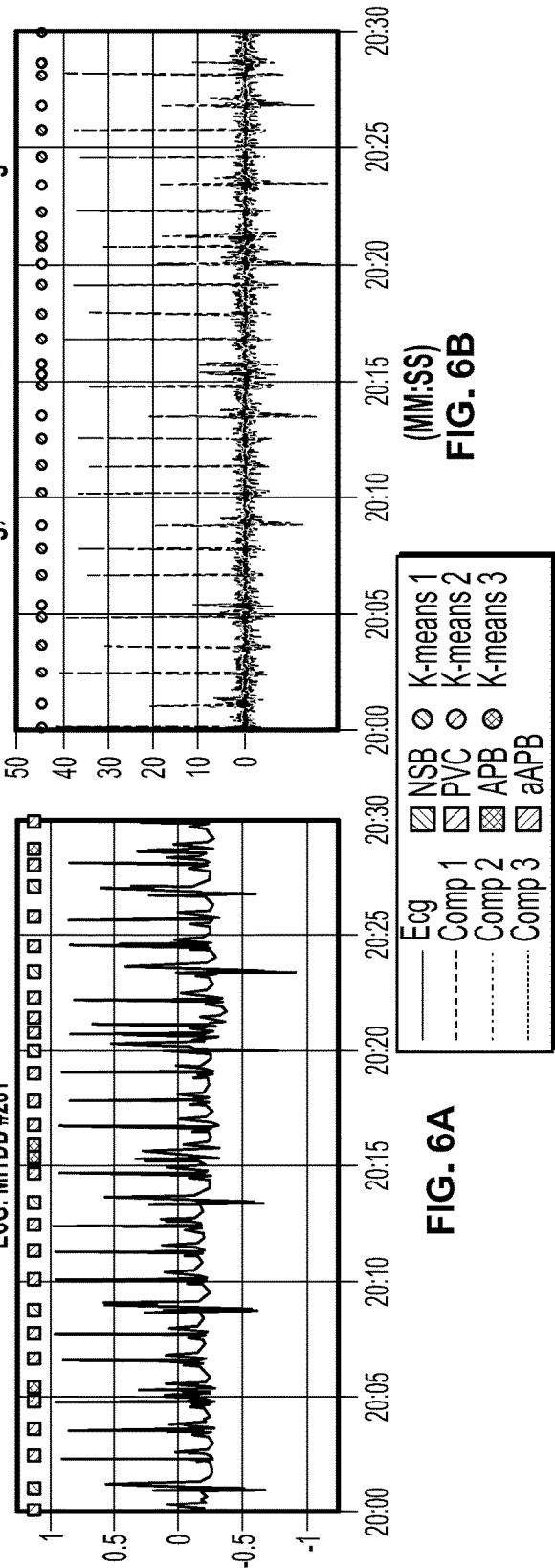
FIG. 6A
FIG. 6B
FIG. 6C
FIG. 6D
FIG. 6E

PATTERN AND DELAY RECOVERY WITH HIGHER-ORDER SPECTRA

GOVERNMENT INTEREST STATEMENT

This invention was made with government support under Grant No. R01 DC004290 awarded by the National Institutes of Health. The government has certain rights in the invention.

BACKGROUND

Field of the Invention

The present invention relates to generally to signal processing and, in particular, to methods and devices for finding the time at which some fixed signal of interest appears in a background of stationary noise; and, more specifically where there is no foreknowledge of the signal or its timing.

Background of the Invention

Finding the time at which some fixed signal of interest appears in a background of stationary noise is a stock problem in signal processing. If the signal and noise spectra are known in advance, optimal filtering for delay recovery is well understood. On the other hand, if the signal is unknown, but its timing is known, recovering the signal is usually a matter of taking an average over suitably aligned records. Very often, however, the problem must be approached with no foreknowledge of the signal or its timing, both of which need to be recovered through a comparison of multiple channels or sequential records in which the signal may appear at different delays. Most solutions to delay estimation rely on second-order statistics related to cross-spectra, or its equivalent in the time domain, cross-correlation, which yield asymptotically optimal delay estimators, provided a consistent estimator of the relevant statistic is in hand.[1,2] Here we consider a common scenario in which consistent second-order estimators are not available: that of recovering a signal from a large number of brief records, all of which contain the signal with unknown and mutually random delays in a background of independent noise. This scenario applies to a wide range of problems, including the recovery of a weak transient captured by a large number of varyingly spaced sensors and the identification of stable recurring patterns within long-duration record through the comparison of sequential epochs. The latter describes a very general problem of pattern identification, whose solution will be obtained here as a byproduct of delay estimation.

Common applications in which such problems arise are: (1) Online detection, denoising and classification of recurring features within clinically relevant bioelectrical signals, such as electrocardiogram (ECG) and electroencephalogram (EEG). (2) Recovery, denoising and classification of emitted or reflected transient electromagnetic or acoustic signals received at multiple sensors or sensor arrays with mutually varying and unknown delays, as in the detection and identification of targets with active and passive Multiple Input Multiple Output (MIMO) Radar and Sonar. (3) Recovery of radio and acoustic signals from multipath distortion. (4) Identification and denoising of asynchronously transmitted broad-spectrum carrier-waveforms and recovery of information encoded therein, as used in ultra-wideband (UWB) radio transmission. (5) Applications to transmission and eavesdropping within UWB channels in which carrier waveforms are not known in advance and may not be easily discriminated from noise or competing signals using conventional spectral or time-domain techniques.

SUMMARY

According to first broad aspect, the present invention provides a method of processing a signal of interest, comprising the steps of: receiving a data record having a period from $T_0$ to $T_n$ and containing a signal of interest disposed between $T_0$ and $T_n$, the signal of interest having a lag $T_d$ from $T_0$ and a peak power between $T_x$ and $T_y$; computing bispectral statistics on the data record; generating a weighting H for a bispectral filter, calculating a linear filter G; applying linear filter G to the data record at the peak power of the signal of interest; and aligning the signal of interest to prior signals of interest with respect to respective time delays $T_{dS}$.

According to a second broad aspect, the present invention provides A method of processing a signal of interest, comprising the steps of: receiving a data record having a period from $T_0$ to $T_n$ and containing a signal of interest disposed between $T_0$ and $T_n$, the signal of interest having a lag $T_d$ from $T_0$ and a peak power between $T_x$ and $T_y$; computing bispectral statistics on the data record; generating a weighting H for a bispectral filter, calculating a linear filter G; applying linear filter G to the data record at the peak power of the signal of interest; and aligning the signal of interest to prior signals of interest with respect to respective time delays $T_{dS}$; wherein the weighting H is defined by:

$$\hat{H}[\omega_1, \omega_2] = K \frac{\sum_{k=1}^{K} X_k[\omega_1] X_k[\omega_2] X_k^*[\omega_1 + \omega_2]}{\sum_{i=1}^{K} |X_i[\omega_1]|^2 \sum_{j=1}^{K} |X_k[\omega_2] X_k^*[\omega_1 + \omega_2]|^2};$$

and
wherein the linear filter G is defined by:

$$G = \frac{1}{K} \sum_{\omega_2=-W}^{W} \sum_{j=1}^{K} X_j[\omega_2] X_j^*[\omega_1 + \omega_2] \hat{H}[\omega_1, \omega_2]$$

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 2a-2i illustrate the application of the bispectral delay algorithm to in- and out-band noise according to one embodiment of the present invention.

FIG. 6a-6e illustrate the application of the bispectral decomposition technique towards blind classification of normal and abnormal heart-beats in ECG according to one embodiment of the present invention.

DETAILED DESCRIPTION OF THE INVENTION

Definitions

Figure 1:
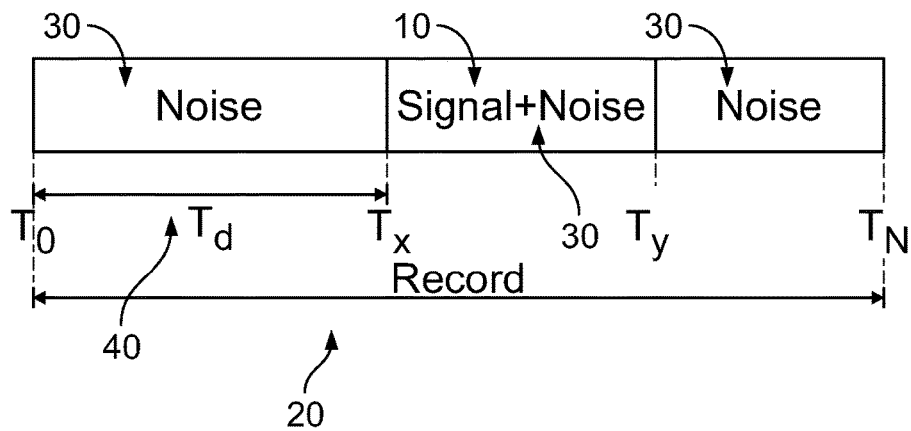
FIG. 1 is a diagram showing a signal of interest embedded in a record having Gaussian noise distributed throughout the record according to one embodiment of the present invention.
Figure 2C:
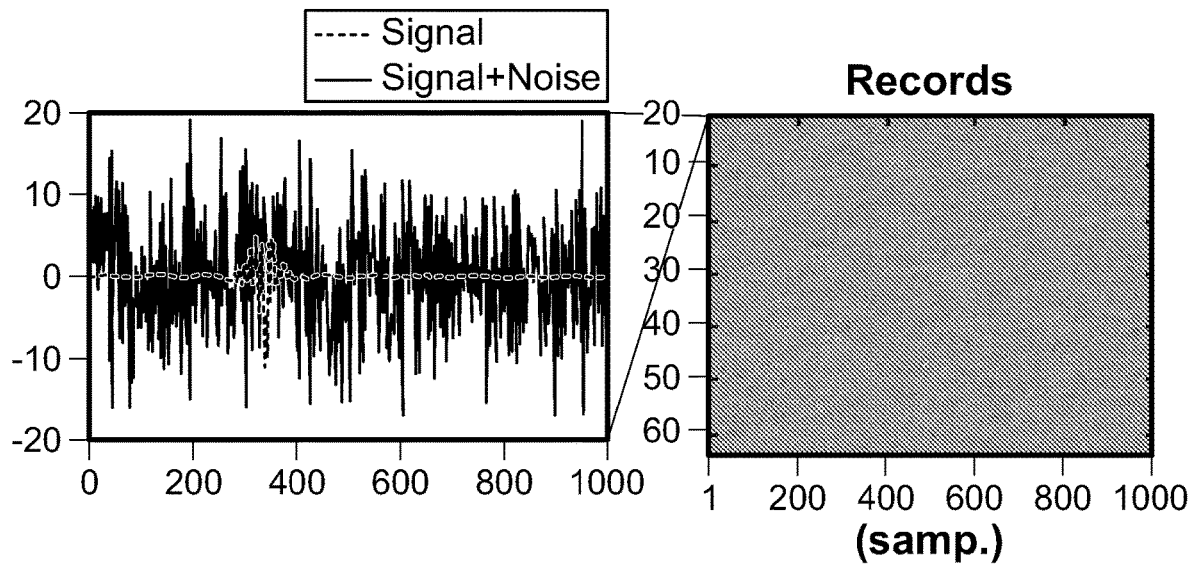
Figure 2C:
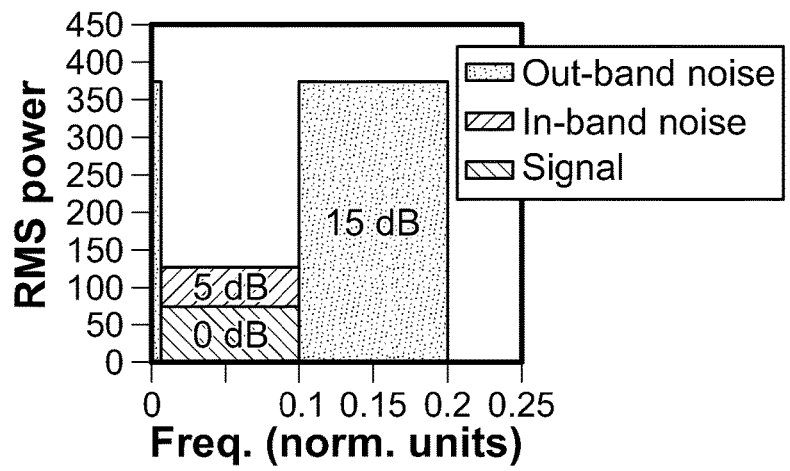
Figure 2D:
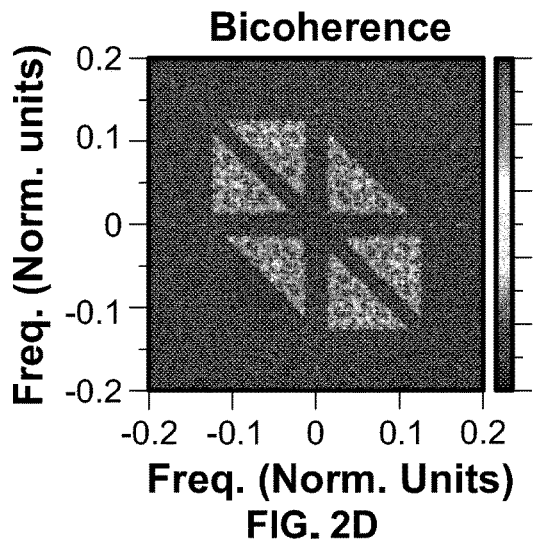
Figure 2E:
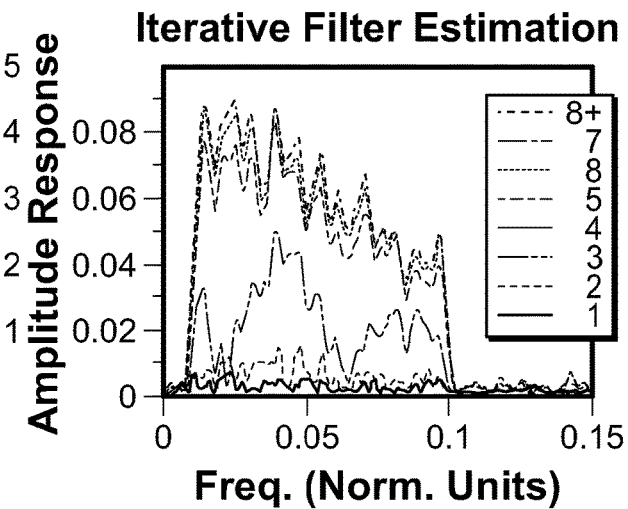
Figure 2F:
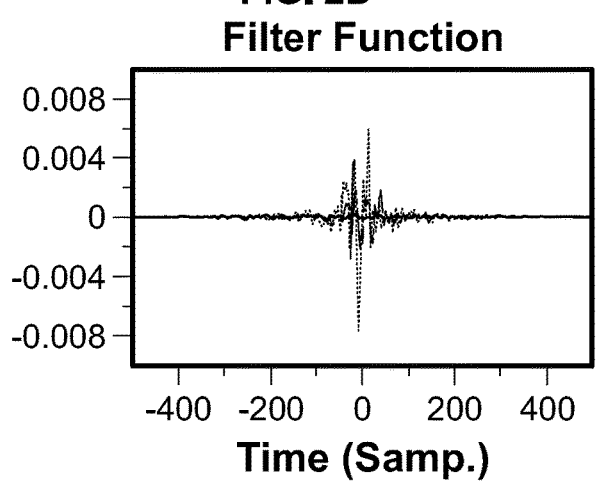
Figure 2G:
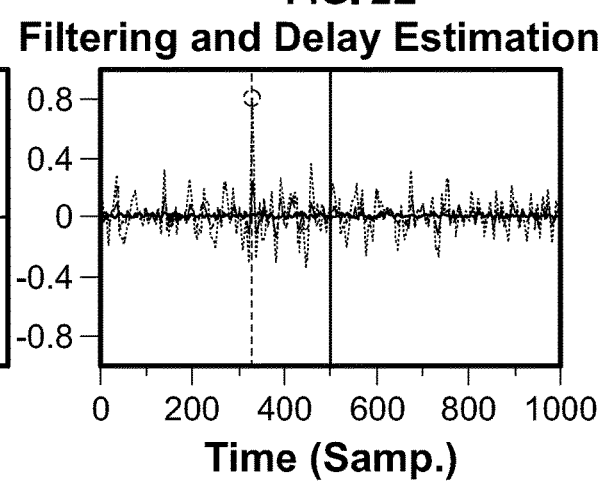
Figure 2H:
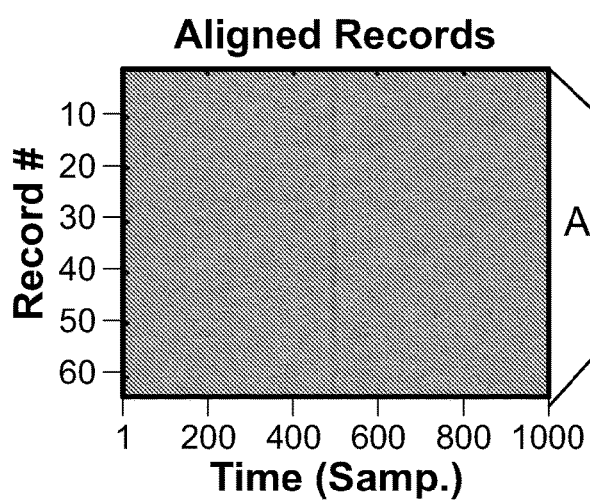
Figure 2I:
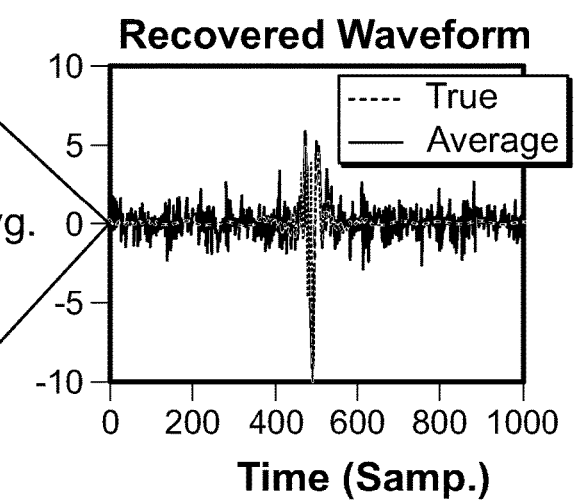

Where the definition of terms departs from the commonly used meaning of the term, applicant intends to utilize the definitions provided below, unless specifically indicated.

For purposes of the present invention, the term "associated" with respect to data refers to data that are associated or linked to each other. For example, data relating the identity of an individual sensor (sensor identity data) may be associated with signal data from each respective individual sensor.

For the purposes of the present invention, the term "Bluetooth®" refers to a wireless technology standard for exchanging data over short distances (using short-wavelength radio transmissions in the ISM band from 2400-2480 MHz) from fixed and mobile devices, creating personal area networks (PANs) with high levels of security. Created by telecom vendor Ericsson in 1994, it was originally conceived as a wireless alternative to RS-232 data cables. It can connect several devices, overcoming problems of synchronization. Bluetooth® is managed by the Bluetooth® Special Interest Group, which has more than 18,000-member companies in the areas of telecommunication, computing, networking, and consumer electronics. Bluetooth® was standardized as IEEE 802.15.1, but the standard is no longer maintained. The SIG oversees the development of the specification, manages the qualification program, and protects the trademarks. To be marketed as a Bluetooth® device, it must be qualified to standards defined by the SIG. A network of patents is required to implement the technology and are licensed only for those qualifying devices.

For the purposes of the present invention, the term "cloud computing" is synonymous with computing performed by computers that are located remotely and accessed via the Internet (the "Cloud"). It is a style of computing where the computing resources are provided "as a service", allowing users to access technology-enabled services "in the cloud" without knowledge of, expertise with, or control over the technology infrastructure that supports them. According to the IEEE Computer Society it "is a paradigm in which information is permanently stored in servers on the Internet and cached temporarily on clients that include desktops, entertainment centers, table computers, notebooks, wall computers, handhelds, etc." Cloud computing is a general concept that incorporates virtualized storage, computing and web services and, often, software as a service (SaaS), where the common theme is reliance on the Internet for satisfying the computing needs of the users. For example, Google Apps provides common business applications online that are accessed from a web browser, while the software and data are stored on the servers. Some successful cloud architectures may have little or no established infrastructure or billing systems whatsoever including Peer-to-peer networks like BitTorrent and Skype and volunteer computing like SETI@home. The majority of cloud computing infrastructure currently consists of reliable services delivered through next-generation data centers that are built on computer and storage virtualization technologies. The services may be accessible anywhere in the world, with the Cloud appearing as a single point of access for all the computing needs of data consumers. Commercial offerings may need to meet the quality of service requirements of customers and may offer service level agreements. Open standards and open source software are also critical to the growth of cloud computing. As customers generally do not own the infrastructure, they are merely accessing or renting, they may forego capital expenditure and consume resources as a service, paying instead for what they use. Many cloud computing offerings have adopted the utility computing model which is analogous to how traditional utilities like electricity are consumed, while others are billed on a subscription basis. By sharing "perishable and intangible" computing power between multiple tenants, utilization rates may be improved (as servers are not left idle) which can reduce costs significantly while increasing the speed of application development. A side effect of this approach is that "computer capacity rises dramatically" as customers may not have to engineer for peak loads. Adoption has been enabled by "increased high-speed bandwidth" which makes it possible to receive the same response times from centralized infrastructure at other sites.

For purposes of the present invention, the term "computer" refers to any type of computer or other device that implements software including an individual computer such as a personal computer, laptop computer, tablet computer, mainframe computer, mini-computer, etc. A computer also refers to electronic devices such as an electronic scientific instrument such as a spectrometer, a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc. Various processes of the present invention may be carried out using a computer. Various functions of the present invention may be performed by one or more computers.

For the purposes of the present invention, the term "computer hardware" and the term "c" refer to the digital circuitry and physical devices of a computer system, as opposed to computer software, which is stored on a hardware device such as a hard disk. Most computer hardware is not seen by normal users, because it is embedded within a variety of every day systems, such as in automobiles, microwave ovens, electrocardiograph machines, compact disc players, and video games, among many others. A typical personal computer may consist of a case or chassis in a tower shape (desktop) and the following illustrative parts: motherboard, CPU, RAM, firmware, internal buses (PIC, PCI-E, USB, HyperTransport, CSI, AGP, VLB), external bus controllers (parallel port, serial port, USB, Firewire, SCSI, PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present invention, the term "computer network" refers to a group of interconnected computers. Networks may be classified according to a wide variety of characteristics. The most common types of computer networks in order of scale include: Personal Area Network (PAN), Local Area Network (LAN), Campus Area Network (CAN), Metropolitan Area Network (MAN), Wide Area Network (WAN), Global Area Network (GAN), Internetwork (intranet, extranet, Internet), and various types of wireless networks. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable (most commonly category 5 cable). Less common are microwave links (as in IEEE 802.11) or optical cable ("optical fiber").

For the purposes of the present invention, the term "computer software" and the term "software" refers to one or more computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Software may include websites, programs, video games, etc. that are coded by programming languages like C, C++, Java, etc. Computer software is usually regarded as anything but hardware, meaning the "hard" are the parts that are tangible (able to hold) while the "soft" part is the intangible objects inside the computer. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For the purposes of the present invention, the term "computer system" refers to any type of computer system that implements software including an individual computer such as a personal computer, mainframe computer, mini-computer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that typically includes the following components: a case or chassis in a tower shape (desktop) and the following parts: motherboard, CPU, RAM, firmware, internal buses (PIC, PCI-E, USB, Hyper-Transport, CSI, AGP, VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present invention, the term "data" means the reinterpretable representation of information in a formalized manner suitable for communication, interpretation, or processing. Although one type of common type data is a computer file, data may also be streaming data, a web service, etc. The term "data" is used to refer to one or more pieces of data.

For the purposes of the present invention, the term "database" or "data record" refers to a structured collection of records or data that is stored in a computer system. The structure is achieved by organizing the data according to a database model. The model in most common use today is the relational model. Other models such as the hierarchical model and the network model use a more explicit representation of relationships (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For the purposes of the present invention, the term "database management system (DBMS)" represents computer software designed for the purpose of managing databases based on a variety of data models. A DBMS is a set of software programs that controls the organization, storage, management, and retrieval of data in a database. DBMS are categorized according to their data structures or types. It is a set of prewritten programs that are used to store, update and retrieve a Database.

For the purposes of the present invention, the term "data storage medium" or "data storage device" refers to any medium or media on which a data may be stored for use by a computer system. Examples of data storage media include floppy disks, Zip™ disks, CD-ROM, CD-R, CD-RW, DVD, DVD-R, memory sticks, flash memory, hard disks, solid state disks, optical disks, etc. Two or more data storage media acting similarly to a single data storage medium may be referred to as a "data storage medium" for the purposes of the present invention. A data storage medium may be part of a computer.

For purposes of the present invention, the term "hardware and/or software" refers to functions that may be performed by digital software, digital hardware, or a combination of both digital hardware and digital software. Various features of the present invention may be performed by hardware and/or software.

For purposes of the present invention, the term "individual" refers to an individual entity such as a mammal, a fish, bird or reptile.

For the purposes of the present invention, the term "Internet" is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies. The Internet carries various information resources and services, such as electronic mail, online chat, file transfer and file sharing, online gaming, and the inter-linked hypertext documents and other resources of the World Wide Web (WWW).

For the purposes of the present invention, the term "Internet protocol (IP)" refers to a protocol used for communicating data across a packet-switched internetwork using the Internet Protocol Suite (TCP/IP). IP is the primary protocol in the Internet Layer of the Internet Protocol Suite and has the task of delivering datagrams (packets) from the source host to the destination host solely based on its address. For this purpose, Internet Protocol defines addressing methods and structures for datagram encapsulation. The first major version of addressing structure, now referred to as Internet Protocol Version 4 (Ipv4) is still the dominant protocol of the Internet, although the successor, Internet Protocol Version 6 (Ipv6) is actively deployed world-wide. In one embodiment, an EGI-SOA of the present invention may be specifically designed to seamlessly implement both of these protocols.

For the purposes of the present invention, the term "intranet" refers to a set of networks, using the Internet Protocol and IP-based tools such as web browsers and file transfer applications that are under the control of a single administrative entity. That administrative entity closes the intranet to all but specific, authorized users. Most commonly, an intranet is the internal network of an organization. A large intranet will typically have at least one web server to provide users with organizational information. Intranets may or may not have connections to the Internet. If connected to the Internet, the intranet is normally protected from being accessed from the Internet without proper authorization. The Internet is not considered to be a part of the intranet.

For the purposes of the present invention, the term "local area network (LAN)" refers to a network covering a small geographic area, like a home, office, or building. Current LANs are most likely to be based on Ethernet technology. The cables to the servers are typically on Cat 5e enhanced cable, which will support IEEE 802.3 at 1 Gbit/s. A wireless LAN may exist using a different IEEE protocol, 802.11b, 802.11g or possibly 802.11n. The defining characteristics of LANs, in contrast to WANs (wide area networks), include their higher data transfer rates, smaller geographic range, and lack of a need for leased telecommunication lines. Current Ethernet or other IEEE 802.3 LAN technologies operate at speeds up to 10 Gbit/s.

For the purposes of the current invention, the term "low powered wireless network" refers to an ultra-low powered wireless network between sensor nodes and a centralized device. The ultra-low power is needed by devices that need to operate for extended periods of time from small batteries energy scavenging technology. Examples of low powered wireless networks are ANT, ANT+, Bluetooth Low Energy (BLE), ZigBee and WiFi.

For purposes of the present invention, the term "machine-readable medium" refers to any tangible or non-transitory medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" includes, but is limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks. The term "machine-readable medium" may include a single medium or multiple media (e.g., a centralized or distributed database, and/or associated caches and servers) that store the one or more instructions or data structures.

For the purposes of the present invention, the term "MEMS" refers to Micro-Electro-Mechanical Systems. MEMS, is a technology that in its most general form may be defined as miniaturized mechanical and electro-mechanical elements (i.e., devices and structures) that are made using the techniques of microfabrication. The critical physical dimensions of MEMS devices can vary from well below one micron on the lower end of the dimensional spectrum, all the way to several millimeters. Likewise, the types of MEMS devices can vary from relatively simple structures having no moving elements, to extremely complex electromechanical systems with multiple moving elements under the control of integrated microelectronics. A main criterion of MEMS may include that there are at least some elements having some sort of mechanical functionality whether or not these elements can move. The term used to define MEMS varies in different parts of the world. In the United States they are predominantly called MEMS, while in some other parts of the world they are called "Microsystems Technology" or "micromachined devices." While the functional elements of MEMS are miniaturized structures, sensors, actuators, and microelectronics, most notable elements may include microsensors and microactuators. Microsensors and microactuators may be appropriately categorized as "transducers," which are defined as devices that convert energy from one form to another. In the case of microsensors, the device typically converts a measured mechanical signal into an electrical signal.

For the purposes of the present invention the term "mesh networking" refers to a type of networking where each node must not only capture and disseminate its own data, but also serve as a relay for other nodes, that is, it must collaborate to propagate the data in the network. A mesh network can be designed using a flooding technique or a routing technique. When using a routing technique, the message is propagated along a path, by hopping from node to node until the destination is reached. To ensure all its paths' availability, a routing network must allow for continuous connections and reconfiguration around broken or blocked paths, using self-healing algorithms A mesh network whose nodes are all connected to each other is a fully connected network. Mesh networks can be seen as one type of ad hoc network. Mobile ad hoc networks and mesh networks are therefore closely related, but mobile ad hoc networks also have to deal with the problems introduced by the mobility of the nodes. The self-healing capability enables a routing-based network to operate when one node breaks down or a connection goes bad. As a result, the network is typically quite reliable, as there is often more than one path between a source and a destination in the network. Although mostly used in wireless situations, this concept is also applicable to wired networks and software interaction.

For the purposes of the present invention the term "mobile ad hoc network" is a self-configuring infrastructureless network of mobile devices connected by wireless. Ad hoc is Latin and means "for this purpose". Each device in a mobile ad hoc network is free to move independently in any direction and will therefore change its links to other devices frequently. Each must forward traffic unrelated to its own use, and therefore be a router. The primary challenge in building a mobile ad hoc network is equipping each device to continuously maintain the information required to properly route traffic. Such networks may operate by themselves or may be connected to the larger Internet. Mobile ad hoc networks are a kind of wireless ad hoc networks that usually has a routable networking environment on top of a Link Layer ad hoc network. The growths of laptops and wireless networks have made mobile ad hoc networks a popular research topic since the mid-1990s. Many academic papers evaluate protocols and their abilities, assuming varying degrees of mobility within a bounded space, usually with all nodes within a few hops of each other. Different protocols are then evaluated based on measure such as the packet drop rate, the overhead introduced by the routing protocol, end-to-end packet delays, network throughput etc.

For the purposes of the present invention, the term "network hub" refers to an electronic device that contains multiple ports. When a packet arrives at one port, it is copied to all the ports of the hub for transmission. When the packets are copied, the destination address in the frame does not change to a broadcast address. It does this in a rudimentary way, it simply copies the data to all of the Nodes connected to the hub. This term is also known as hub. The term "Ethernet hub," "active hub," "network hub," "repeater hub," "multiport repeater" or "hub" may also refer to a device for connecting multiple Ethernet devices together and making them act as a single network segment. It has multiple input/output (I/O) ports, in which a signal introduced at the input of any port appears at the output of every port except the original incoming. A hub works at the physical layer (layer 1) of the OSI model. The device is a form of multiport repeater. Repeater hubs also participate in collision detection, forwarding a jam signal to all ports if it detects a collision.

For purposes of the present invention, the term "non-transient storage medium" refers to a storage medium that is non-transitory, tangible and computer readable. Non-transient storage medium may refer generally to any durable medium known in the art upon which data can be stored and later retrieved by data processing circuitry operably coupled with the medium. A non-limiting non-exclusive list of exemplary non-transitory data storage media may include magnetic data storage media (e.g., hard disc, data tape, etc.), solid state semiconductor data storage media (e.g., SDRAM, flash memory, ROM, etc.), and optical data storage media (e.g., compact optical disc, DVD, etc.).

For purposes of the present invention, the term "processor" refers to a device that performs the basic operations in a computer. A microprocessor is one example of a processor For the purposes of the present invention, the term "random-access memory (RAM)" refers to a type of computer data storage. Today it takes the form of integrated circuits that allow the stored data to be accessed in any order, i.e. at random. The word random thus refers to the fact that any piece of data can be returned in a constant time, regardless of its physical location and whether or not it is related to the previous piece of data. This contrasts with storage mechanisms such as tapes, magnetic discs and optical discs, which rely on the physical movement of the recording medium or a reading head. In these devices, the movement takes longer than the data transfer, and the retrieval time varies depending on the physical location of the next item. The word RAM is mostly associated with volatile types of memory (such as DRAM memory modules), where the information is lost after the power is switched off. However, many other types of memory are RAM as well, including most types of ROM and a kind of flash memory called NOR-Flash.

For the purposes of the present invention, the term "read-only memory (ROM)" refers to a class of storage media used in computers and other electronic devices. Because data stored in ROM cannot be modified (at least not very quickly or easily), it is mainly used to distribute firmware (software that is very closely tied to specific hardware, and unlikely to require frequent updates). In its strictest sense, ROM refers only to mask ROM (the oldest type of solid state ROM), which is fabricated with the desired data permanently stored in it, and thus can never be modified. However, more modern types such as EPROM and flash EEPROM can be erased and re-programmed multiple times; they are still described as "read-only memory" because the reprogramming process is generally infrequent, comparatively slow, and often does not permit random access writes to individual memory locations.

For the purposes of the present invention, the term "real-time processing" refers to a processing system designed to handle workloads whose state is constantly changing. Real-time processing means that a transaction is processed fast enough for the result to come back and be acted on as transaction events are generated. In the context of a database, real-time databases are databases that are capable of yielding reliable responses in real-time.

For the purposes of the present invention, the term "router" refers to a networking device that forwards data packets between networks using headers and forwarding tables to determine the best path to forward the packets. Routers work at the network layer of the TCP/IP model or layer 3 of the OSI model. Routers also provide interconnectivity between like and unlike media devices. A router is connected to at least two networks, commonly two LANs or WANs or a LAN and its ISP's network.

For the purposes of the present invention, the term "server" refers to a system (software and suitable computer hardware) that responds to requests across a computer network to provide, or help to provide, a network service. Servers can be run on a dedicated computer, which is also often referred to as "the server," but many networked computers are capable of hosting servers. In many cases, a computer can provide several services and have several servers running Servers may operate within a client-server architecture and may comprise computer programs running to serve the requests of other programs the clients. Thus, the server may perform some task on behalf of clients. The clients typically connect to the server through the network but may run on the same computer. In the context of Internet Protocol (IP) networking, a server is a program that operates as a socket listener. Servers often provide essential services across a network, either to private users inside a large organization or to public users via the Internet. Typical computing servers are database server, file server, mail server, print server, web server, gaming server, application server, or some other kind of server. Numerous systems use this client/server networking model including Web sites and email services. An alternative model, peer-to-peer networking may enable all computers to act as either a server or client as needed.

For the purposes of the present invention, the term "solid-state electronics" refers to those circuits or devices built entirely from solid-state materials and in which the electrons, or other charge carriers, are confined entirely within the solid-state material. The term is often used to contrast with the earlier technologies of vacuum and gas-discharge tube devices and it is also conventional to exclude electromechanical devices (relays, switches, hard drives and other devices with moving parts) from the term solid state. While solid-state materials can include crystalline, polycrystalline and amorphous solids and refer to electrical conductors, insulators and semiconductors, the building material is most often a crystalline semiconductor. Common solid-state devices include transistors, microprocessor chips, and RAM. A specialized type of RAM called flash RAM is used in flash drives and more recently, solid state drives to replace mechanically rotating magnetic disc hard drives. More recently, the integrated circuit (IC), the light-emitting diode (LED), and the liquid-crystal display (LCD) have evolved as further examples of solid-state devices. In a solid-state component, the current is confined to solid elements and compounds engineered specifically to switch and amplify it.

For the purposes of the present invention, the term "solid state sensor" refers to sensor built entirely from a solid-state material such that the electrons or other charge carriers produced in response to the measured quantity stay entirely with the solid volume of the detector, as opposed to gas-discharge or electro-mechanical sensors. Pure solid-state sensors have no mobile parts and are distinct from electro-mechanical transducers or actuators in which mechanical motion is created proportional to the measured quantity.

For purposes of the present invention, the term "storage medium" refers to any form of storage that may be used to store bits of information. Examples of storage media include both volatile and non-volatile memories such as MRRAM, MRRAM, ERAM, flash memory, RFID tags, floppy disks, Zip™ disks, CD-ROM, CD-R, CD-RW, DVD, DVD-R, flash memory, hard disks, optical disks, etc. Two or more storage media acting similarly to a single data storage medium may be referred to as a "storage medium" for the purposes of the present invention. A storage medium may be part of a computer.

For the purposes of the present invention, the term "transmission control protocol (TCP)" refers to one of the core protocols of the Internet Protocol Suite. TCP is so central that the entire suite is often referred to as "TCP/IP." Whereas IP handles lower-level transmissions from computer to computer as a message makes its way across the Internet, TCP operates at a higher level, concerned only with the two end systems, for example a Web browser and a Web server. In particular, TCP provides reliable, ordered delivery of a stream of bytes from one program on one computer to another program on another computer. Besides the Web, other common applications of TCP include e-mail and file transfer. Among its management tasks, TCP controls message size, the rate at which messages are exchanged, and network traffic congestion.

For the purposes of the present invention, the term "time" refers to a component of a measuring system used to sequence events, to compare the durations of events and the intervals between them, and to quantify the motions of objects. Time is considered one of the few fundamental quantities and is used to define quantities such as velocity. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms.

For the purposes of the present invention, the term "timestamp" refers to a sequence of characters, denoting the date and/or time at which a certain event occurred. This data is usually presented in a consistent format, allowing for easy comparison of two different records and tracking progress over time; the practice of recording timestamps in a consistent manner along with the actual data is called timestamping. Timestamps are typically used for logging events, in which case each event in a log is marked with a timestamp. In file systems, timestamp may mean the stored date/time of creation or modification of a file. The International Organization for Standardization (ISO) has defined ISO 8601 which standardizes timestamps.

For the purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automatic teller machine (ATM) etc.

For the purposes of the present invention, the term "wearable device" refers to a device that may be mounted, fastened or attached to a user or any part of a user's clothing, or incorporated into items of clothing and accessories which may be worn on the body of a user. In some embodiments, wearable device refers to wearable technology, wearables, fashionable technology, tech togs, fashion electronics, clothing and accessories, such as badges, watches, and jewelry incorporating computer and advanced electronic technologies.

For the purposes of the present invention, the term "web service" refers to the term defined by the W3C as "a software system designed to support interoperable machine-to-machine interaction over a network". Web services are frequently just web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. In such systems, there is often machine-readable description of the operations offered by the service written in the Web Services Description Language (WSDL). The latter is not a requirement of a SOAP endpoint, but it is a prerequisite for automated client-side code generation in many Java and .NET SOAP frameworks. Some industry organizations, such as the WS-I, mandate both SOAP and WSDL in their definition of a Web service. More recently, RESTful Web services have been used to better integrate with HTTP compared to SOAP-based services. They do not require XML messages or WSDL service-API definitions.

For the purposes of the present invention, the term "wide area network (WAN)" refers to a data communications network that covers a relatively broad geographic area (i.e. one city to another and one country to another country) and that often uses transmission facilities provided by common carriers, such as telephone companies. WAN technologies generally function at the lower three layers of the OSI reference model: the physical layer, the data link layer, and the network layer.

For the purposes of the present invention, the term "World Wide Web Consortium (W3C)" refers to the main international standards organization for the World Wide Web (abbreviated WWW or W3). It is arranged as a consortium where member organizations maintain full-time staff for the purpose of working together in the development of standards for the World Wide Web. W3C also engages in education and outreach, develops software and serves as an open forum for discussion about the Web. W3C standards include: CSS, CGI, DOM, GRDDL, HTML, OWL, RDF, SVG, SISR, SOAP, SMIL, SRGS, SSML, VoiceXML, XHTML+ Voice, WSDL, XACML. XHTML, XML, XML Events, Xforms, XML Information, Set, XML Schema, Xpath, Xquery and XSLT.

For the purposes of the present invention, the term "Zig-Bee" refers a specification for a suite of high level communication protocols used to create personal area networks built from small, low-power digital radios. ZigBee is based on an IEEE 802 standard. Though low-powered, ZigBee devices often transmit data over longer distances by passing data through intermediate devices to reach more distant ones, creating a mesh network; i.e., a network with no centralized control or high-power transmitter/receiver able to reach all the networked devices. The decentralized nature of such wireless ad-hoc networks makes them suitable for applications where a central node can't be relied upon. ZigBee may be used in applications that require a low data rate, long battery life, and secure networking. ZigBee has a defined rate of 250 kbit/s, best suited for periodic or intermittent data or a single signal transmission from a sensor or input device. Applications include wireless light switches, electrical meters with in-home-displays, traffic management systems, and other consumer and industrial equipment that requires short-range wireless transfer of data at relatively low rates. The technology defined by the ZigBee specification is intended to be simpler and less expensive than other WPANs, such as Bluetooth® or Wi-Fi. Zigbee networks are secured by 128 bit encryption keys.

For a known signal in white noise, the signal itself, reversed in time, gives the so-called "matched filter", which is optimal in the mean-squared sense for detecting the signal in a background of wide-sense-stationary (WSS). When the noise is Gaussian, the matched filter also corresponds to the maximum likelihood estimator[1]. If the noise is not white, then the filter also weights frequencies according to the relative signal-to-noise ratio. In estimating delays between pairs of noise-corrupted signals, optimal linear filters are derived under Gaussian assumptions as weighted cross-spectra, related to coherence[2].

For purposes of the present invention, the term "comprising", the term "having", the term "including," and variations of these words are intended to be open-ended and mean that there may be additional elements other than the listed elements.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, a value or property is "based" on a particular value, property, the satisfaction of a condition, or other factor, if that value is derived by performing a mathematical calculation or logical decision using that value, property or other factor.

For purposes of the present invention, "Gaussian noise" is statistical noise having a probability density function (PDF) equal to that of the normal distribution, which is also known as the Gaussian distribution. In other words, the values noise can take on are Gaussian-distributed.

For purposes of the present invention, "signal-to-noise ratio" is the ratio of the strength of an electrical or other signal carrying information to that of interference, generally expressed in decibels.

For purposes of the present invention, "higher-order spectra" (HOS) measures are extensions of second-order measures (such as the autocorrelation function and power spectrum) to higher orders. The second-order measures work fine if the signal has a Gaussian (Normal) probability density function, but many real-life signals are non-Gaussian. The easiest way to introduce the HOS measures is just to show some definitions, so that the reader can see how they are related to the familiar second-order measures. Here are definitions for the time-domain and frequency-domain third-order HOS measures, assuming a zero-mean, discrete signal x(n), Time Domain Measures In the time domain, the second order measure is the autocorrelation function $R(m)=<x(n)x(n+m)>$ where $<>$ is the expectation operator.

The third-order measure is called the third-order moment $M(m1,m2)=<x(n)x(n+m1)x(n+m2)>$ Note that the third-order moment depends on two independent lags m1 and m2. Higher order moments can be formed in a similar way by adding lag terms to the above equation. The signal cumulants can be easily derived from the moments.

Frequency Domain

In the frequency domain the second-order measure is called the power spectrum P(k), and it can be calculated in two ways:

Take a Discrete Fourier Transform (DFT) of the autocorrelation function;

$P(k)=DFT[R(m)]$.

Or: Multiply together the signal Fourier Transform X(k) with its complex conjugate;

$P(k)=X(k)X^*(k)$

A third-order the bispectrum B(k,l) can be calculated in a similar way:

Take a Double Discrete Fourier Transform (DDFT) of the third-order cumulant;

$B(k,l)=DDFT[M(m1,m2)]$

Or: Form a product of Fourier Transforms at different frequencies;

$B(k,l)=X(k)X(l)X^*(k+l)$

For purposes of the present invention, bispectrum is a statistic used to search for nonlinear interactions. The Fourier transform of the second-order cumulant, i.e., the autocorrelation function, s the traditional power spectrum.

For purposes of the present invention, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For the purposes of the present invention, the term "signal delay" is the time delay from an arbitrary starting point $T_0$ where one monitors for the existence of a signal of interest. This signal delay is represented by $T_d$.

For the purposes of the present invention, the term "lag(s)" is the time delay between channels, i.e. time delay between respective sensors in the system for detecting the signal delay $T_d$.

For the purposes of the present invention, the term "stationary" describes a signal-generating process for which the expectation of any measure computed on a finite sample from the process does not depend on the time at which the sample was obtained.

For the purposes of the present invention, the term "wide-sense stationary" describes a signal-generating process for which the expectation of the autocorrelation of a finite sample of the signal does not depend on the time at which the sample was obtained.

For the purposes of the present invention, the term "$n^{th}$-order stationary" describes a signal-generating process for which the expectation of the $n^{th}$-order moment of a finite sample of the signal does not depend on the time at which the sample was obtained.

For the purposes of the present invention, the term "expectation" denotes the mean of a specified measure over the distribution of samples from a random process, where the distribution is conditioned on all information available to an observer prior to observing a sample.

DESCRIPTION

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

In the present context, the fundamental problem with second-order methods in signal processing is their inability to distinguish energy in the signal from that of the noise. They are effective only when the signal spectrum stands out clearly from that of the noise within individual records, as might commonly be the case for very narrow-band signals or under conditions of high overall signal-to-noise ratio[3].

One way to proceed is to find some other statistic capable of making the distinction. FIG. 1 illustrates a signal of interest 10 in a record 20 having Gaussian noise 30. Because the signal of interest 10 appears in our record 20 at unknown signal delay(s) $T_d$ 40, such a statistic should ideally be insensitive to arbitrary shifts of time, as is the case for the power spectrum; but unlike the power spectrum it must also vanish for the noise process or otherwise separate clearly from the signal. A promising direction to commence our search is towards higher-order moments, in particular, their frequency-domain representations as so-called higher-order spectra (HOS). HOS describe forms of statistical dependence across frequencies that are invariant under translation in time.[4,5,6] For a real-valued signal, x(t), with Fourier transform, $X(\omega)=\mathscr{F}\{x(t)\}$, given a time shift, $\tau$, we have $$\mathscr{F}\{x(t-\tau)\}=X(\omega)e^{i\omega\tau} \quad (1)$$

HOS relate to products in the signal spectrum:

$$E[X(\omega_1)X(\omega_2)\ldots X(\omega_{K+1})] \quad (2)$$

taken at combinations of frequencies which sum to zero:

$$\sum_{k=1}^{K+1}\omega_k=0.$$

Such products are time-shift invariant because the exponential terms from Eq. (1) mutually cancel. Products of K+1 such frequencies are known as the $K^{th}$ order spectrum. Recalling that for a real-valued signal $X(-\omega)=X^*(\omega)$, the second-order spectrum is $E[X(\omega)X(-\omega)]=E[|X(\omega)|^2]$, which is clearly the same as the power spectrum. The third-order spectrum is also known as the bispectrum:

$$M_K(\omega_1,\omega_2)=E[X(\omega_1)X(\omega_2)X^*(\omega_1+W_2)] \quad (3)$$

If the noise process is Gaussian, then the second requirement is directly fulfilled as well: because linear-time invariant Gaussian processes are fully characterized by second-order statistics, stationary Gaussian noise exhibits no cross-frequency dependence. For this reason, it is possible to recover signal HOS from randomly shifted signals in a background of Gaussian noise, provided the signal HOS are non-vanishing. But if the signal is transient, i.e. having a duration of $T_y$-$T_x$, meaning here its duration is finite, its energy must be infinitely extended over frequency, for which reason a fixed transient signal will always have non-vanishing HOS at all orders, at least in principle. In practice, of course, we care only about the portion of the spectrum that stands a chance of being recovered from noise, which might be narrow, especially if the transient is highly oscillatory. Thus, in practice, HOS-related techniques are most applicable to signals that are spectrally broad or contain multiple spectrally narrow components spaced widely in the frequency domain. If the noise is not Gaussian but itself has non-vanishing HOS, all hope is not lost: the wealth of information in the multi-dimensional space of HOS leaves a much greater array of options for distinguishing signal-related features from those of noise. One option we will consider seeks a decomposition of the observed HOS, similar in spirit to a singular-value decomposition.

The theoretical promise of HOS in the present setting is obvious enough. Taking classical second-order approaches to delay-estimation as a model, the most obvious way to proceed with HOS-derived delay estimators would invoke non-linear prediction theory with appropriate models of the signal distribution, both of which raise some daunting and highly context-dependent technical challenges. Here, we will attempt a much simpler formulation of the problem: we will seek a filter whose expected output contains a peak at peak of the power of the signal 10 between time $T_x$ and $T_y$, such that any displacement of the peak by WSS noise is minimized. This strategy will allow for a more compact treatment of delay estimation, which in the context of second-order statistics still yields the same estimators as the conventional approach. The main reason for adopting this approach is that it provides a relatively easy path to the exposition of optimized filtering with HOS without any need, going in, for nonlinear prediction theory or exacting distributional assumptions. Adopting this strategy will require the following assumptions: 1) that the noise process is wide-sense stationary, 2) that the relevant signal moments are bounded and observable, and 3) that the signal is continuous, such that its autocorrelation is twice differentiable at zero lag. Unless otherwise specified, it will also be assumed that the relevant HOS of the noise process vanishes. The extension to noise processes with non-vanishing HOS will be given some consideration at the end, alongside the closely related problem of separating multiple concurrent signals.

The application of HOS to delay estimation and related problems has been explored by a few authors, primarily in the context of stationary systems with the aim of identifying fixed lags between channels. But because consistent cross-spectral estimators are available in this setting, the range of conditions under which HOS estimators provide any compelling advantage is quite circumscribed.[7,8] Nikias and Pan first considered the application of bispectral phase to time-delay estimation.[8] Hinich and Wilson derived large-sample properties of bispectral delay estimators which average over bispectral phase with uniform weighting by way of the distribution of the underlying HOS estimators. In this work they relate the variance of the phase bispectrum to the bispectrum normalized by the product of noise power at respective frequencies. Although they do not prescribe any optimization of delay estimators based on their analysis, their observation suggests that delay estimators might be improved by weighting the summation over phase by the magnitude of bicoherence. Overall, the tenor of this literature is not one of unbridled enthusiasm, tending to the view that HOS-derived delay estimators are most useful in rather specialized cases involving non-Gaussian signals in a background of correlated Gaussian noise at relatively high signal-to-noise ratios.

The application of higher-order moments to estimating arrival times of transient signals was addressed in a series of papers by Pflug and colleagues,[11,12,13] who considered lag estimation from peaks in third- and fourth-order cross correlations, treating them analogously to ordinary cross correlations. Because higher-order correlations are the inverse Fourier transforms of the corresponding HOS, this approach relates directly to HOS delay estimation. Considered from the spectral domain, a crucial limitation of their technique is that it neglects the effect of the non-zero phase of signal HOS, making it effective only for signals with large zero-lag correlations, i.e. substantial skewness or kurtosis. Their strategy was to impose the skewness condition by rectifying the signal, which, beyond distorting it, comes at the rather steep cost of introducing non-linearities in otherwise Gaussian noise, severely limiting the broader usefulness of the technique.

A possible solution to these shortcomings is to first apply a linear filter that maximizes the zero-lag moment of specified order. The output of such a filter should satisfy the zero-lag moment requirement of the higher-order correlation delay estimator while avoiding any distortion of Gaussian noise, which remains Gaussian under the application of a linear filter. Such moment-maximizing filters have been considered separately by several authors.[14,15,16] The idea was also applied by Pflug and colleagues,[17] separately from the higher-order correlation technique, to the problem of transient detection. The possibility of remediating the higher-order correlation technique with moment-maximizing filters appears to have been overlooked in this work, however.

The present work considers the optimization of delay estimators directly rather than as a problem secondary to HOS estimation. The goal will not be the optimization of HOS estimators, as such, rather we aim to optimize delay estimators by taking advantage of information in HOS, leading to a simpler formulation of the problem. Approaching the matter from this angle leads to a much more encouraging prospect than what previous literature suggests: HOS-derived delay estimators may dramatically outperform conventional estimators, even or rather, especially under conditions of extreme noise in the detection of transient signals. We have recently sketched out an interpretational framework for relating the bispectrum to transient signal features:[10] the present application builds on insights described in Kovach 2018.

The present technique can be understood, loosely, as combining moment-maximizing filters with higher-order-correlation delay estimation, which it improves with noise optimization and extends towards a proper decomposition of the signal. Limitations of the higher-order correlation technique of Pflug and colleagues are alleviated in the spectral domain by normalizing higher-order cross spectra with respective higher-order phase auto-spectra, which cancels the contribution of the auto-phase spectrum,[8] a process that can be regarded as applying a moment-maximizing filter. Moment maximizing filters assume a straightforward meaning in this view: because the zero-lag moment is obtained by integrating over the corresponding HOS of the filtered signal, and because the latter is the product of the signal HOS and the deterministic HOS of the filter, the zero-lag moment can be regarded as an inner product between the two. For a filter of a given amplitude response, the zero-lag $k^{th}$ order moment is maximized when the phase response of the filter HOS matches the signal higher-order phase spectrum, as is, for example, the case with a matched filter. Neglecting the effect of noise, the HOS of the filtered signal is then uniformly real and positive for the same reason that the output of a matched filter is the signal autocorrelation (centered at the appropriate delay). From this perspective it is easy to see that the signal autocorrelation must maximize all zero-lag moments. In the case of non-deterministic HOS, this view leads to a natural interpretation of the moment-maximizing filter as a projection that explains the greatest amount of energy in the corresponding HOS, reminiscent of the singular value decomposition of a covariance matrix. Within previous literature, the usefulness of this connection appears to be under-appreciated.

Beyond this treatment, the present work introduces two crucial additional improvements. First, it adds a general framework for noise optimization, which extends very easily to estimators derived from the bispectrum and other HOS, leading naturally to filters derived from auto-bicoherence in the bispectral case or polycoherence more generally. Second, an iterative technique is developed, which uses the re-aligned average cross-bispectrum (respectively, cross-polyspectrum) to sequentially improve the suppression of noise. These advances provide dramatic improvements in the detection of weak transient signals, while imposing little restriction on the form of the signal, beyond its stable recurrence across records. The approach extends naturally in many directions: here it is developed for the bispectrum, but it might be applied advantageously to other HOS, particularly those of odd order. Finally, it extends naturally towards decomposing a signal into multiple distinct features, raising the possibility of not only separating a signal from noise but also of blindly distinguishing among multiple concurrent signals and non-Gaussian noise with non-vanishing HOS.

Next, we develop a framework for noise-optimization, applying it first towards deriving optimal filters from second-order statistics. Before applying it to HOS we demonstrate that it yields conventional delay estimators when applied to second-order statistics. In the case of a known signal, it will recover the matched filter,[2] while in estimating the delay between two noisy signals, it yields the coherence-derived maximum-likelihood delay estimator.[1]

We seek a linear filter that, given the observed signal, x, containing some feature, f, embedded at delay, τ, yields an expected output containing a peak at τ. Optimal estimators will be obtained by minimizing the variance of the peak location under perturbation by wide-sense stationary noise. It will be shown that solving the problem is simply a matter of finding the filter that maximizes the ratio of second derivatives at zero lag in the respective autocorrelations of the filtered signal and noise. The main restriction is that the signal autocorrelation, $f^{(2)}=f*f$, is twice differentiable at zero lag, which means that f, itself, must be continuous[1], or, in the frequency domain, its spectrum must be square integrable. Suppose that f is embedded in a background of independent stationary Gaussian colored noise with spectrum $E[|N(\omega)|^2]=\sigma(\omega)$:

$$x(t)=f(t-\tau)+n(t) \quad (4)$$

We wish to identify the lag at which f appears in x using a filter, h, whose output should contain a peak as close to τ as possible. Consider the output, $r(t)=(h*x)(t)$; we require that the expectation of r contains an extremum at τ, meaning that $$E[r'(\tau)] = E\left[\frac{d}{dt}\bigg|_{t=\tau} r(t)\right] = 0 \quad (5)$$

We also wish to minimize any perturbation of the extremum from τ by noise. A figure of merit for this purpose is the ratio between the expected squared first derivative, $E[(r'(\tau))^2]$, and the expectation of the second derivative, $E[r''(\tau)]$, both evaluated at τ. This choice is justified because the noise-perturbed extremum will be shifted by ε, such that $$E[r''(\tau)]\epsilon + r'(\tau) \approx 0 \quad (6)$$

for which reason it is sensible to design h to minimize $$\rho = E[\epsilon^2] = \frac{E[(r'(\tau))^2]}{E[r''(\tau)]^2} \quad (7)$$

The value of ρ describes the expected perturbation of the peak location; but there is of course no guarantee that the peak will correspond to the maximum value within the record in the presence of noise. It can therefore be taken as the variance of the delay estimator in the limit of high signal-to-noise ratio.

The Fourier transform of the expected second derivative of the filtered signal is $$\mathcal{F}\{E[r''(t)]\}=E[-\omega^2 X(\omega)H(\omega)]=-\omega^2 F(\omega)H(\omega)e^{i\omega\tau} \quad (8)$$

hence, evaluated at τ

$$E[r''(\tau)]=\int \omega^2 F(\omega)H(\omega)d\omega \quad (9)$$

Similarly, Expanding the square of the first derivative in the Fourier domain, $$E[(r'(\tau))^2]=\iint -\omega\xi(F(\omega)+N(\omega)e^{i\omega\tau})(F(\xi)+N(\xi)e^{i\xi\tau})H(\omega)H(\xi)d\omega d\xi \quad (10)$$

Due to the fact that the noiseless term in the expansion of the integrand is the squared expected derivative at τ, which vanishes, and the noise is assumed stationary and zero-mean, so that $E[N(\omega)]=0$ and $E[N(\omega)N(\xi)]=\sigma(\omega)\delta(\omega+\xi)$, this reduces to $$E[(r'(\tau))^2] = \int \omega^2 \sigma(\omega)|H(\omega)|^2 d\omega \quad (11)$$

In other words, the expected squared slope of r at T is the negative of the second derivative of the autocorrelation of the filtered noise at 0 lag. This might be done by identifying where the derivative of Eq. (7) with respect to $|H(\omega)|$ vanishes, but the problem may be further simplified into an easily solved quadratic form by way of an equivalent Lagrangian function:

$$\Lambda = E[(r'(\tau))^2]+\rho(1-E[r''(\tau)]) \quad (12)$$

for which the extremum is found directly by completing the square:

$$\Lambda = \int \omega^2 \sigma(\omega)\left|H(\omega) - \rho\frac{F^*(\omega)}{\sigma(\omega)}\right|^2 d\omega - \rho^2 \int \omega^2 \frac{|F(\omega)|^2}{\sigma(\omega)}d\omega + \rho \quad (13)$$

minimized at $$H(\omega) = \rho\frac{F^*(\omega)}{\sigma(\omega)} \text{ for } \omega \neq 0 \quad (14)$$

Because arbitrary rescaling of H does not affect the result, the constant ρ will be dropped henceforth. This result is the same as the well-known matched filter,[1] obtained by maximizing the ratio of peak values of the respective autocorrelation functions, that is, the ratio of the signal variance to noise variance, rather than the second derivatives. The resulting solutions are the same in this case because the squared frequency term introduced by the second derivative in both terms of (12) ends up canceling from (13). One may ask, why bother with the derivatives? The advantage will lie in the fact that all noise-independent parts of the equations that result from squaring the first derivative at T will vanish, in contrast to the peak values, eliminating some terms from the resulting equations.

[1] Technically speaking, "almost everywhere:" any discontinuity must contribute no measurable energy to the signal.

A slightly different signal model, used in deriving the Wiener filter,[18] leads to a form which includes combined signal and noise power in the denominator. The discrepancy arises because the model assumes both the noise and signal generating process to be stationary, whereas the matched filter looks for only a single instance of the signal within a given observation window. The former assumption is appropriate if, for example, the occurrence of f is driven by a stationary Poisson process: in such cases, the background of "noise" which perturbs the peak at τ, includes any nearby f's overlapping with the instance at τ. Another way of saying this is that we want the estimator to optimally separate neighboring peaks from each other, as well as from the noise. This leads us to the following filter:

$$H(\omega) = \frac{F^*(\omega)}{\lambda(\omega)|F(\omega)|^2 + \sigma(\omega)} \quad (15)$$

where λ(ω) is the power spectrum of the intensity function of the point process, equal to constant squared intensity if the process is homogenous. The same argument applies for any WSS noise, whether Gaussian or not; the denominator always contains the combined total power of the signal and all other additive processes contributing to the error in the peak location.

A compelling practical reason to favor (15) even when the stationary model is not appropriate is that the denominator may be estimated directly from the total power of the observed signal, without having to disentangle the contributions of noise and signal. The two models also converge as signal-to-noise ratio diminishes, which limits the practical importance of the distinction. Formally, the use of (15) as a general-purpose estimator may be justified by noting that it places an upper bound on (10). The integrand in Eq. (10) clearly attains a non-negative maximum where $\xi=-\omega$, implying that $$E[(r'(\tau))^2] \leq E[A \int \omega^2 |F(\omega)+N(\omega)e^{-i\omega\tau}|^2 |H(\omega)|^2 d\omega] = A \int \omega^2 [|F(\omega)|^2 + \sigma(\omega)] |H(\omega)|^2 d\omega \quad (16)$$

for some constant, A. We are merely using total power as an upper bound on noise-only power.

The value of $r(\tau)$ relates to the signal-to-noise ratio. The expected squared value of $r(\tau)$ is:

$$E[r^2(\tau)] = E[r(\tau)]^2 + \int \frac{|F(\omega)|^2}{\sigma} d\omega = E[r(\tau)]^2 + E[r(\tau)] \quad (17)$$

The variance of $r(\tau)$ is therefore equal to its value: $E[r^2(\tau)] - E[r(\tau)]^2 = E[r(\tau)]$, implying that the expected value of $r(\tau)$ comes normalized, such that, $$\frac{E[r(\tau)]^2}{\text{Var}[r(\tau)]} = E[r^2(\tau)] - E[r(\tau)]^2 = E[r(\tau)]$$

This assumes that the signal is constant; if the signal is instead subject, for example, to some variation of amplitude, then $\tau$ shrinks in relation to the amplitude variance. For this reason, the peak values of $r(\tau)$ may be too conservative to provide a useful estimate of signal-to-noise ratio in many settings.

The expected squared deviation of the peak from $\tau$ (i.e. $\rho$), can also be determined by substituting H back into the definition of $\rho$, giving $$\rho = \left[\int \omega^2 \frac{|F(\omega)|^2}{\sigma(\omega)} d\omega\right]^{-1} \quad (18)$$

The foregoing analysis extends to the case when the goal is to identify the relative delays between two noisy channels, both of which contain the signal, keeping total energy fixed. Now we have $$x_1(t) = f(t+\tau_1) + n_1(t)$$
$$x_2(t) = f(t+\tau_2) + n_2(t) \quad (19)$$

where $n_1$ and $n_2$ are generated by zero-mean noise processes with independent phase, so that $E[N_1(\omega)N_2(\omega)] = 0$, but possibly correlated power. We wish to optimize h to provide a peak near $\tau_1 - \tau_2$ in $$r(t) = \int X_1(\omega) X_2^*(\omega) H(\omega) e^{i\omega t} d\omega \quad (20)$$

It is straightforward to apply the same line of argumentation as in the previous case, and it will not be repeated here in detail. For independent noise, it leads to the result $$H(\omega) = \frac{|F(\omega)|^2}{|F(\omega)|^2(\sigma_1(\omega)+\sigma_2(\omega)) + E[|N_1(\omega)|^2|N_2(\omega)|^2]} \quad (21)$$

If the noise in either channel vanishes, we may equate the noise-free channel to F and include it in H. Eq. (21) then reduces to Eq. (14), as one should expect.

If the noise processes are identical and Gaussian, (21) simplifies to $$H(\omega) = \frac{|F(\omega)|^2/\sigma^2(\omega)}{2|F|^2/\sigma(\omega)+1} \quad (22)$$

which is same as the well-known maximum-likelihood delay estimator for Gaussian signals.[2] It is noteworthy that this estimator is obtained here with comparatively few starting assumptions about the signal distribution. This will greatly ease the burden of extending the argument to non-Gaussian signals. For example, we may apply equation (21) to non-Gaussian noise processes for which power is correlated across channels within frequency bands, with independent phase. In this example, the estimator in equation (21) adds an additional penalty to the weighting of spectral regions where the correlation of power is high, while rewarding regions where power is anti-correlated across channels. For example, if the signal always appears randomly without noise in one channel and with noise in the other, so that $E[|N_1(\omega)|^2|N_2(\omega)|^2] = 0 \neq \sigma_1(\omega)\sigma_2(\omega)$, Eq. (21) still reduces to Eq. (14).

So far we have considered the delay between isolated signals. If the underlying detection problem involves the possibility of multiple overlapping occurrences of the signal, we are, again, better off with the upper bound that includes both signal and noise power in the denominator, as in (16). In this case we have $$H(\omega) = \frac{|F(\omega)|^2}{E[|F(\omega)+N_1(\omega)|^2|F(\omega)+N_2(\omega)|^2]} \quad (23)$$

which, for Gaussian noise, becomes $$H(\omega) = \frac{|F(\omega)|^2}{(|F(\omega)|^2+\sigma_1(\omega))(|F(\omega)|^2+\sigma_2(\omega))} \quad (24)$$

The denominator in (23) is estimated easily enough from total signal power, but it remains for us to find a suitable estimator of the numerator. The conventional approach to delay estimation treats the magnitude of the cross-spectrum of the two channels as such an estimator, in which case the outcome is equivalent to obtaining a delay estimator from coherency between $x_1$ and $x_2$, weighted by coherence; that is, the estimator will have the magnitude of squared coherence while preserving the phase of coherency. But in the setting, we are presently concerned with, no consistent estimator is available of the pairwise cross-spectra between records. We have access to a large number of records of short duration in which f appears with random, mutually independent delay. One might be tempted to seek an estimator of the signal power by averaging the pairwise magnitude cross-spectra across all channels, but in so doing the error in the cross-spectral estimate is squared along with the signal, hence averaging over channels does not improve the signal-to-noise ratio. We find ourselves at an impasse, because we need the delays to estimate the signal, but the signal to estimate the delays and both may be too corrupted to be recovered separately. We next describe how to overcome the impasse by appealing to higher order spectra.

Because HOS are time-shift invariant, it will be possible to develop statistically consistent estimators of both the numerator and the denominator of the filter, and therefore an asymptotically optimal h, when doing so is not possible with second-order statistics. We assume initially that the background noise is independent and Gaussian. Stationary non-Gaussian noise with non-vanishing bispectra will be considered later as well; in such cases, it is of course not directly possible to distinguish signal-related third-order statics from that of the noise process. However, the richness of information recovered in the bispectrum raises the prospect of a decompositional approach to the problem, under which we may still stand a good chance of isolating the contribution of the signal from that of the noise. This idea will be developed in a later section.

For a real-valued signal, x(t) with Fourier transform X($\omega$), the moment bispectrum is a third-order statistic given in the frequency domain as the expectation of a product over three frequencies that sum to zero:[6]

$$\beta(\omega_1,\omega_2) = E[X(\omega_i)X(\omega_2)X(-\omega_1-\omega_2)] \quad (25)$$

The significance of this particular combination of frequencies lies in time-shift invariance, which comes about from the fact that the Fourier transform of a shifted signal is $\mathcal{F}\{X(t+\tau)\} = X(\omega)e^{i\omega\tau}$, hence any shift, $\tau$, cancels within the product in Eq. (2.2). The same idea extends to spectra of any order: $E[X(\omega_1) \ldots X(\omega_k) \ldots X(\omega_K)]$ is time-shift invariant only if $\Sigma\omega_k = 0$. Such higher-order spectra describe aspects of the signal which can be measured in the absence of information about timing. Because a Gaussian process is determined by first- and second-order statistics, the moment bispectrum of a linear time-invariant Gaussian system also vanishes at $\omega_1 \neq -\omega_2 \neq 0$ (and everywhere if the signal is zero mean). These properties make bispectral measures, and HOS more generally, especially useful for identifying non-Gaussian signal components embedded at unknown times in Gaussian noise of undetermined spectrum.

The cross bispectrum takes the product as in (25) over two or more channels. We will start with the two-channel case from Eq. (19). Note that the phase of the cross bispectrum, like that of the ordinary cross-spectrum, encodes the lag between channels, $\Delta\tau_{jk} = \tau_j - \tau_k$:

$$\beta_{122} = E[X_1(\omega_1)X_2(\omega_2)X_2^*(\omega_1+\omega_2)] \quad (26)$$
$$= F(\omega_1)F(\omega_2)F^*(\omega_1+\omega_2)e^{-i\omega_1\Delta\tau_{12}}$$

Denote the output of the $j^{th}$-order HOS filter of the $k^{th}$ channel as $r_{k_1 \ldots k_j}$ with $r_k(t) = h*x_k(t)$. Pursuing the same strategy as before, define a filter, H, now in the two-dimensional bispectral domain, such that $$r_{122}(t) = \int X_1(\omega_1)e^{i\omega_1 t}\int X_2(\omega_2)X_2^*(\omega_1+\omega_2)H(\omega_1,\omega_2)d\omega_2 d\omega_1 \quad (27)$$

The expectation of the second derivative reduces to $$E[r_{122}''(\Delta\tau)] = -\int \omega_1^2 F(\omega_1)\int F(\omega_2)F^*(\omega_1+\omega_2)H(\omega_1,\omega_2)d\omega_2 d\omega_1 \quad (28)$$

and the expectation of the square of the first derivative is:

$$E[(r_{122}'(\Delta\tau))^2] = E[\omega_1(F(\omega_1)+N_1(\omega_1))(F(\omega_2)+N_2(\omega_2))$$
$$(F^*(\omega_1+\omega_2)+N_2^*(\omega_1+\omega_2))H(\omega_1,\omega_2)d\omega_2 d\omega_1 \times \int \xi_1$$
$$(F(\xi_1)+N_1(\xi_1))(F(\xi_2)+N_2(\xi_2))(F^*(\xi_1+\xi_2)+N_2^*$$
$$(\xi_1+\xi_2))H(\xi_1,\xi_2)d\xi_2 d\xi_1] \quad (29)$$

Bounded Form

Eq. (29) might be simplified with the boundary considered in (16)

$$E[(r_{122}'(\Delta\tau_{12}))^2] \leq A^2\int \omega_1^2 E[|F(\omega_1)+N_1(\omega_1)|^2|F(\omega_2)+N_2(\omega_2)|^2|F(\omega_1+\omega_2)+N_2(\omega_1+\omega_2)|^2]H(\omega_1,\omega_2)|^2 d\omega_2 d\omega_1 \quad (32)$$

In this case, substituting (28) and (32) into the Lagrangian (12), and completing the square gives $$H(\omega_1,\omega_2) = \frac{F^*(\omega_1)F^*(\omega_2)F(\omega_1+\omega_2)}{E[|F(\omega_1)+N_1(\omega_1)|^2|F(\omega_2)+N_2(\omega_2)|^2|F(\omega_1+\omega_2)+N_2(\omega_1+\omega_2)|^2]} \quad (33)$$

Bicoherence Weighting

Various options for how we might estimate the denominator in (33) relate to different definitions of what is commonly called bicoherence. In general, the denominator of H will be estimated across records with the assumption that the noise processes are identically distributed, while the numerator is taken from the bispectral estimator computed over records, which assumes the latter to be a consistent estimator of $F(\omega_1)F(\omega_2)F^*(\omega_1+\omega_2)$. If the noise process is Gaussian and identical across channels, the terms within the expectation of the denominator in (33) separate into the product of signal-plus-noise power spectra.

$$(|F(\omega_1)|^2+\sigma(\omega_1))(|F(\omega_2)|^2+\sigma(\omega_2))(|F(\omega_1+\omega_2)|^2+\sigma(\omega_1+\omega_2)) \quad (34)$$

In this case we find that H itself separates into the product of three terms, meaning that it is not necessary to apply the filter in the bispectral domain, rather the equivalent outcome is obtained by filtering each signal with $H(\omega) = F^*/(|F(\omega)|^2+\sigma(\omega))$, which is exactly the same as the matched filter. The difference here is that it will often be possible to obtain a consistent estimator of the numerator in Eq. (33) when no consistent estimators of cross spectra are available. It is also the case that the final outcome of the bispectral filter, $r_{122}$ in Eq. (27), is not linear, which will prove advantageous under some conditions.

More generally, we might prefer to relax the Gaussian assumption and estimate the product in the denominator of (33) directly, rather than take for granted that the terms are independent. The most commonly used definition of bicoherence[19] is obtained here under the assumption that the noise processes are independent across records, but not across frequency bands, in which case the denominator of (33) separates into the product of the power spectrum at $\omega_1$ and the expected product of signal-plus-noise power at $\omega_1$ and $\omega_1+\omega_2$, that is $$(|F(\omega_1)|^2+\sigma(\omega_1))E[|F(\omega_2)+N(\omega_2)|_2|F(\omega_1+\omega_2)+N(\omega_1+\omega_2)|^2] \quad (35)$$

Unlike that obtained with product of root-mean-squared power spectra, the magnitude of this form is constrained to fall between 0 and 1, as expected for $F(\omega_1)F(\omega_2)F^*(\omega_1+\omega_2)$ $H(\omega_1,\omega_2)$, and allowing it to be interpreted as a normalized measure of dependence across frequencies.

One might also normalize by the expectation of the product of all three terms, which would be justified if noise power is correlated across records as well as frequency bands Another variation that is less easy to justify form first principles, but bears some practical advantages, normalizes by the square of the average amplitude, rather than average power:

$$E[|(F(\omega_1)+N(\omega_1))(F(\omega_2)+N(\omega_2))(F(\omega_1+\omega_2)+N(\omega_1+\omega_2))|]^2 \quad (36)$$

Because this form can be regarded as a simple weighted average over bispectral phase,[20] it allows for a particularly straightforward correction for small-sample and amplitude-related biases, which may otherwise degrade the filter by exaggerating the contribution of frequencies in which power is excessively skewed.[21] Specifically, bias in the bicoherence estimate, $\epsilon$, can be related to the inverse square root of the "effective degrees of freedom" within the average, as $$\epsilon = \frac{\sqrt{\sum w_i^2}}{\sum_i w_i} \quad (37)$$

where the "weights," are given by $\omega_i = |X_i(\omega_1)X_i(\omega_2)X_i(\omega_1+\omega_2)|$. In general, we have observed that the proposed algorithm is not overly sensitive to the choice of normalization, but the amplitude-weighted average seems to perform well under a range of conditions. We have therefore defaulted to this form, in spite of the fact that it is perhaps the least principled of the three. A more detailed examination of the relative merits of these alternatives will be reserved for future work.

There are some additional advantages of the nonlinearity of the bispectral estimator, which apply also at low signal-to-noise ratios. In particular we describe next a clever trick which may be done when there are a large number of records with the signal at low signal to noise ratio, which allows for a dramatically improved suppression of noise. The essential idea is to iteratively realign and average the records to obtain a "clean" example of the signal, which then takes the place of a second channel with much reduced noise.

Methods & Implementation

The following section implements these ideas in an algorithm which recovers the delays between K records, all of which contain f at mutually independent lags in a background of independent Gaussian noise with identical power spectra.

Windowing

The first step is to form the array of records. If these are obtained as shorter intervals of a longer record, then a record duration, L, must be chosen based on the time scale of the signal of interest and computational considerations. It will also make sense to apply a window to the record to suppress spectral leakage in the estimators and, as will be shown later, to aid in the convergence of the iterated alignment. In the following it is assumed that a suitable window has already been applied to each record, $X_j$. It should be appreciated that each element of the array may be the same size to reduce complexity or they may be different sizes.

Bispectral Weighting

In this setting, a consistent estimator of the auto-bispectrum is obtained by averaging over channels, which will be done under the assumption that noise is identically distributed across records. Likewise, the estimator of the numerator is obtained by averaging the respective terms, which may be plugged in to Eq (33), giving the bispectral filter:

$$\hat{H}[\omega_1, \omega_2] = K \frac{\sum_{k=1}^{K} X_k[\omega_1]X_k[\omega_2]X_k^*[\omega_1+\omega_2]}{\sum_{i=1}^{K} |X_i[\omega_1]|^2 \sum_{j=1}^{K} |X_k[\omega_2]X_k^*[\omega_1+\omega_2]|^2} \quad (43)$$

where $X_k[\omega]$ is the fast Fourier transform (FFT) of x[t]. The bispectral filter, H, may be further modified at this stage according to any relevant considerations. For example, it may greatly aid computational efficiency to limit the bandwidth of H. Properties of the estimator might be improved by weighting H according to any incomplete prior information about the signal. In addition, smoothing may be useful for improving statistical properties of H, which may be achieved with time-domain windowing of the inverse FFT of H.

Delay Estimation with Averaged Cross-Bispectra

Eq. (3.1.2) gives us a suitably consistent estimate of the bispectral filter needed for delay estimation. We may take the delay between records i and j, $\Delta\tau_{ij}$ from the maxima in the inverse Fourier transform of $$R_{ijj}[\omega_1] = X_i[\omega_1] \sum_{\omega_2=-W}^{W} X_j[\omega_2]X_j^*[\omega_1+\omega_2]\hat{H}[\omega_1, \omega_2] \quad (44)$$

where $R_{ijj}$ is the FFT of $r_{ijj}$. It may be noted that the summation over $\omega_2$ carries out a convolution in the spectral domain, equivalent to multiplication in the time domain, so that $r_{ijj}(t)=$. It will often be computationally prohibitive to estimate the pairwise delays between all pairs of records; using the multiplicative property of (44) it is possible to greatly improve the efficiency of delay estimation. This comes about by estimating the delay for record i not separately over all other records but from the average cross-bispectrum:

$$R_{i..}[\omega_1] = X_i[\omega_1]\frac{1}{K}\sum_{\omega_2=-W}^{W}\sum_{j=1}^{K} X_j[\omega_2]X_j^*[\omega_1+\omega_2]\hat{H}[\omega_1, \omega_2] \quad (45)$$

Note that (45) describes the application of a linear filter, G, to record i obtained from the following average:

$$G = \frac{1}{K}\sum_{\omega_2=-W}^{W}\sum_{j=1}^{K} X_j[\omega_2]X_j^*[\omega_1+\omega_2]\hat{H}[\omega_1, \omega_2] \quad (46)$$

Properties of this filter are crucial to understanding the success of the algorithm.

First, one might ask, what is the advantage of averaging over j and not i? The frequency-domain convolution within Eq. (44) can be equated to the time-domain operation of squaring after filtering, which we may illustrate with the case of Gaussian noise as $$g[t] = h[t] * \frac{1}{K}\left[\sum_{j=1}^{K}(h*x_j[t] + h*n_j[t])^2\right] \to h[t] * E[(h*f)^2[t-\tau]] \quad (47)$$

where h is the noise-optimal filter implicit in (43). We have dropped a term from this expression that convolves h with a constant offset equal to the filtered noise variance, as its expectation vanishes when h is zero-mean. The operation of squaring is important here; for if we had averaged over i in the first term in (44), we would simply be taking the average of filtered signals over records:

$$\frac{1}{K}\sum_{j=1}^{K} h*x_j[t] + h*n_j[t] \to E[(h*f)[t-\tau]] \quad (48)$$

The expectation of (48) is obtained by convolving f with the probability distribution of delays, τ. Therefore, if f is band-limited above some non-zero frequency, and the distribution of τ's sufficiently diffuse, meaning, in the frequency domain, it's characteristic function is of a sufficiently lowpass character, then Eq. (48), yields nothing of value because the average does not reinforce any component of the signal.

A very different outcome is obtained with the average in Eq. (46): clearly $(h*f)^2$ is non-zero and, more generally, it contains a large amount of energy at low frequencies, for which reason its spectrum overlaps with the characteristic function of the distribution of τ regardless of how great the variance. Another way to understand this is that squaring makes h*f into a much more impulse-like function (recall that h*f is symmetric and zero-phase about τ), and therefore the term within the brackets of (47) recovers something whose expectation approximates the probability distribution of τ. Moreover, a signal with non-vanishing energy in the bispectrum which is band-limited above $W_0$ must have a bandwidth of at least $W_0$. Squaring in the time domain translates energy towards the frequency origin and preserves the bandwidth of the signal within this baseband, for which reason the spectrum of the filter obtained in (46) must also overlap the bandwidth of h, beyond some threshold in the variance of τ. This effectively provides a bridge between the spectra of a high-pass signal and the low-pass distribution of delays.

Iteration

Nevertheless, when the variance of τ's is large, the bridge is quite tenuous. We need to stretch out the spectrum of the average in (46) so that it overlaps as much as possible with the signal spectrum. This may be done in two ways. The first was already carried out in step 1: in additional to suppressing spectral leakage, time windowing broadens the spectrum of average in (46) and serves to bias the convergence of delays towards the center of the window. The second, more important, measure sharpens the distribution of τ's by shifting the records according to the estimated delays. This entails the following iteration:

$$G^{(m+1)} = \frac{1}{K}\sum_{j=1}^{K} e^{i\omega_1 \tau_j^{(m)}} \sum_{\omega_2=-W}^{W} X_j[\omega_2]X_j^*[\omega_1+\omega_2]\hat{H}[\omega_1,\omega_2] \quad (49)$$

where $\tau_j^{(m)}$ is the estimated lag of the $j^{th}$ record after the $m^{th}$ iteration. Even when the distribution of τ'S is initially uniform, we have found in practice that the tendency to cluster around random modes early in the iteration leads to rapid convergence with maximal improvement rarely taking more than 10 or 15 iterations. When the algorithm successfully converges, noise in the quadratic term of the estimator is greatly suppressed, as then $$G[\omega_1] \to \sum_{\omega_2=-W}^{W} F[\omega_2]F^*[\omega_1+\omega_2]H[\omega_1,\omega_2] + O\left(\frac{1}{\sqrt{K}}\right) \to \quad (50)$$

$$\frac{F^*[\omega_1]}{|F[\omega_1]|^2 + \sigma(\omega_1)}$$

$$\int \frac{|F^*[\omega_2]|^2 |F[\omega_1+\omega_2]|^2}{E[|F[\omega_2]| + N[\omega_2]|^2 |F[\omega_1+\omega_2]| + N[\omega_1+\omega_2]|^2]} d\omega_2$$

Which converges to a filter that is approximately the optimal linear filter. For the Gaussian case, we have:

$$g(t) \to h*(h*h)^2(t) \quad (51)$$

Again, because $(h*h)^2$ is an impulse-like function, performance of g typically approaches that of h, and we may substitute g for h.

It may be noted here that similar arguments applied to HOS of order K, lead to filters that approach $$g_K(t) \to h*(h*h)^{(K-1)}(t) \quad (52)$$

which become more impulse-like with increasing K; thus we might expect performance for relatively narrowband signals to improve with increasing order. This observation accords with the minimum bandwidth a signal must have for a non-vanishing $K^{th}$-order HOS: at the minimum bandwidth we have $(K-p)W_1 = pW_0$ for some integer, p, so that $$\Delta W_{min} = W_1 - W_0 = \frac{2p-K}{K-p}W_0.$$

Clearly there is no minimum bandwidth for even order HOS, but for odd, the minimum is $$\Delta W \geq \frac{2}{K-1}W_0.$$

Thus odd-order HOS, and in particular third-order, are suited to the isolation of spectrally broad signals; in the case of the bispectrum, those with bandwidths on the order of the low-cut frequency.

Feature Recovery

Following iterative delay estimation, the feature, F is recovered from the delay-compensated average:

$$\hat{F}(\omega) = \frac{1}{K}\sum_{j=1}^{K} e^{-i\omega\tau_2} X_j(\omega) \quad (53)$$

Signal Detection and Reconstruction

So far the procedure has been applied with the assumption that each record contains exactly one instance of the feature, f. For applications in which the signal-emitting process is random and stationary, as with the Poisson model considered earlier, this assumption is clearly not appropriate, and it will often be necessary to detect the absence of the signal or recover multiple instances of the signal within a given record. A related problem is that of reconstructing the signal component attributed to a process that emits the feature at random intervals. This problem is addressed by first estimating G as though each record contained one instance, then detecting occurrences from peaks within the filtered data using a threshold on the magnitude of the data within each filtered record. The estimate of G may be refined by excluding records in which no peaks surpass the threshold or by adding signal-containing intervals not included in the original estimate. Similarly, the filter may be used to detect signals within new records or records which were not used in estimating the filter.

Detection Threshold

A sensible threshold criterion in the present case retains samples until the scalar cumulant computed over all remaining samples attains some statistically-motivated value. Such a criterion addresses the null-hypothesis that the data contain only Gaussian noise. Applying the idea to the bispectral case, $< \ldots >_{[\theta]}$ as the average excluding values above $\theta$ and compute skewness $$\gamma_{[\theta]} = \frac{\langle r^3(t) \rangle_{[\theta]} - 3 \langle r^2(t) \rangle_{[\theta]} \langle r(t) \rangle_{[\theta]} + 2 \langle r(t) \rangle_{[\theta]}^3}{(\langle r^2(t) \rangle_{[\theta]} - \langle r(t) \rangle_{[\theta]}^2)^{3/2}} \quad (54)$$

Making use of the large-sample standard deviation of skewness, we may attempt to limit the false positive rate to some predetermined value, FP, by setting $\theta > 0$ such that $$\gamma_{[\theta]} < \Phi^{-1}(1 - FP)\sqrt{6/T} \quad (55)$$

where T is the record duration in samples and $\Phi^{-1}$ is the inverse standard normal cumulative distribution function. For example, to limit the probability of a false detection in the absence of a signal to approximately 5 \ %, set $$\gamma_{[\theta]} < 1.64\sqrt{6/T} \quad (56)$$

This approximation assumes the filtered signal to be approximately white; it might be improved by replacing T with a time-bandwidth product of the signal.

Real-Time and Running Averages

Real-time applications might apply a continuously updated estimate of the filter towards detecting the signal within a buffer containing an incoming data stream. Specifically, data written to a buffer at some interval, $\Delta T_{m+1}$ are filtered with $g^{(m)}$, $$r_m(t) = g^{(m-1)} * x_m(t) \quad (57)$$

and the delay estimate is obtained from the delay filter output:

$$\hat{\tau}_m = \underset{i}{\mathrm{argmax}}\, r_m(t) \quad (58)$$

after which H and g may be updated as $$H^{(m+1)} = \frac{B^{(m+1)}}{D^{(m+1)}} \quad (59)$$

where $$B^{(m+1)} = (1-\lambda[\delta_m])B^{(m)} + \lambda[\delta_m](X_m[\omega_1]X_m[\omega_2]X_m^*[\omega_1+\omega_2]) \quad (60)$$

and $$D^{(m+1)} = (1-\lambda[\delta_m])D^{(m)} + \lambda[\delta_m]|X_m[\omega_1]X_m[\omega_2]X_m^*[\omega_1+\omega_2]| \quad (61)$$

The delay-estimating filter, g, may then be updated as $$G^{(m+1)} = (1 - \alpha[\delta_m])G^{(m)} + \qquad (62)$$
$$\alpha[\delta_m]\left(e^{i\omega_1 \hat{\tau}} \sum_{\omega_2=-W}^{W} X_m[\omega_2]X_m^*[\omega_1+\omega_2]H^{(m+1)}[\omega_1,\omega_2]\right)$$

where $\lambda[\delta_m]$ and $\alpha[\delta_m]$ are learning rates within,[0,1] which may be made to depend on the decision parameter $\delta_m$. For example, a hard threshold might be set on the maximum in $r_m$:

$$\delta_m = \begin{cases} 1, & \text{if } \max r_m > \theta_m \\ 0, & \text{otherwise} \end{cases} \text{ with } \lambda[0] = \alpha[0] = 0. \quad (63)$$

Reconstruction

Following detection and thresholding, the signal waveform may be reconstructed in the following steps: 1) Filtering an input record with $g^{(m)}$; input records at this stage may come from any source, and might, for example, be the segmented records used to estimate the filters, the continuous unsegmented record from which segmented records are obtained, or a new record not used in estimating the filters. 2) Applying a threshold to the output of step 1 as described in the previous section. 3) Convolving the thresholded output from step 2 with the feature recovered in the average given by Eq. (53). Finally, 4) scaling the output of step 3 to minimize mean-squared error.

Decomposition of Multi-Component Signals and Signals in Non-Gaussian Noise

Real-world applications must often confront noise that is not Gaussian, whose non-vanishing HOS may mask that of the signal. It is reasonable to expect performance to degrade in this setting for the same reason that Gaussian noise degrades second-order estimators. But there are also a number of differences from the second-order case, which warrant closer inspection. Most importantly, HOS retain more information about the generating process, which might be used to distinguish signal from noise. A framework for putting this information to use is described next.

Assuming the noise to be independent of the signal, the expected sample cumulant HOS is the sum of the deterministic signal HOS and the expected noise HOS. In general, this expectation will not correspond to the deterministic HOS of any function, but it will admit a decomposition into a series of deterministic spectra. We can take for granted that such a decomposition exists, at least for the sample estimate, because the estimate is already obtained from a summation over the deterministic spectra of the records. For our purpose, a more useful decomposition finds a series of functions whose deterministic spectra explain the greatest amount of energy in the sample HOS, in close analogy to the singular value decomposition of a covariance matrix (SVD). We may attempt the decomposition by reconstructing the signal, subtracting the result from the unfiltered signal, and then repeating the algorithm on the residual. Just as the SVD is often used to separate a low-dimensional signal from a background of high-dimensional noise, such a decomposition might likewise isolate a signal with deterministic or otherwise low-dimensional HOS from a background of random non-Gaussian noise.

Such a decomposition is implemented here simply by repeatedly applying filter estimation and signal reconstruction, as described in the previous section, where the $n^{th}$ repetition is applied to the residual after removing the signal component recovered in the $(n-1)^{th}$ application. The number of components thus recovered might be predetermined, or the procedure may be repeated until no sample in the output of filtering at the $n^{th}$ repetition exceeds the skewness threshold described previously.

Computational Efficiency

The summation over $\omega_2$ in (49) is quadratic in W, but needs only to be carried out once at the outset. Each subsequent iteration of the algorithm is linear in W. The efficiency of the algorithm therefore compares favorably with alternative cross-spectral methods, which require pairwise delay estimation and are therefore quadratic in the number of records at each iteration, whenever $W_2 < K_2$. Especially in applications to pattern recovery from long-duration records, in which sub-intervals may easily number in the thousands, the computational burden of the bispectral algorithm compares favorably that of pairwise delay estimation from cross-spectra (or HOS).

Test Signal

Figure 3A:
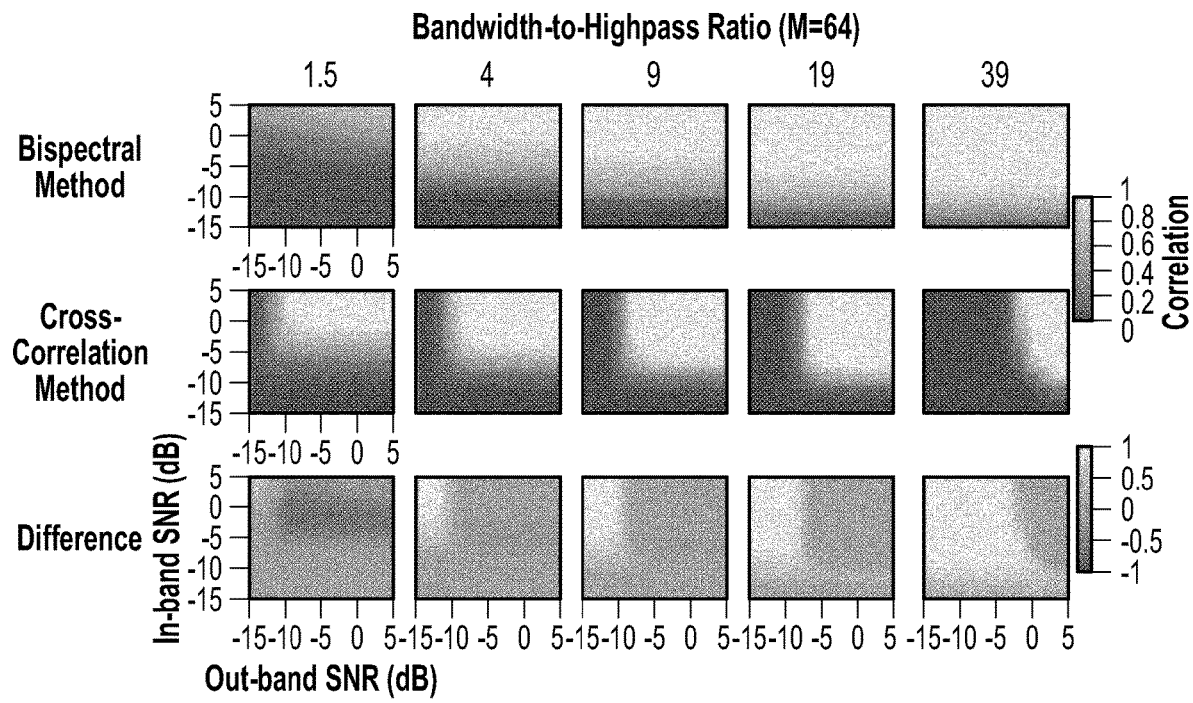
FIG. 3a-3b illustrate the robustness of the bispectral delay algorithm to in- and out-band noise according to one embodiment of the present invention.
Figure 3B:
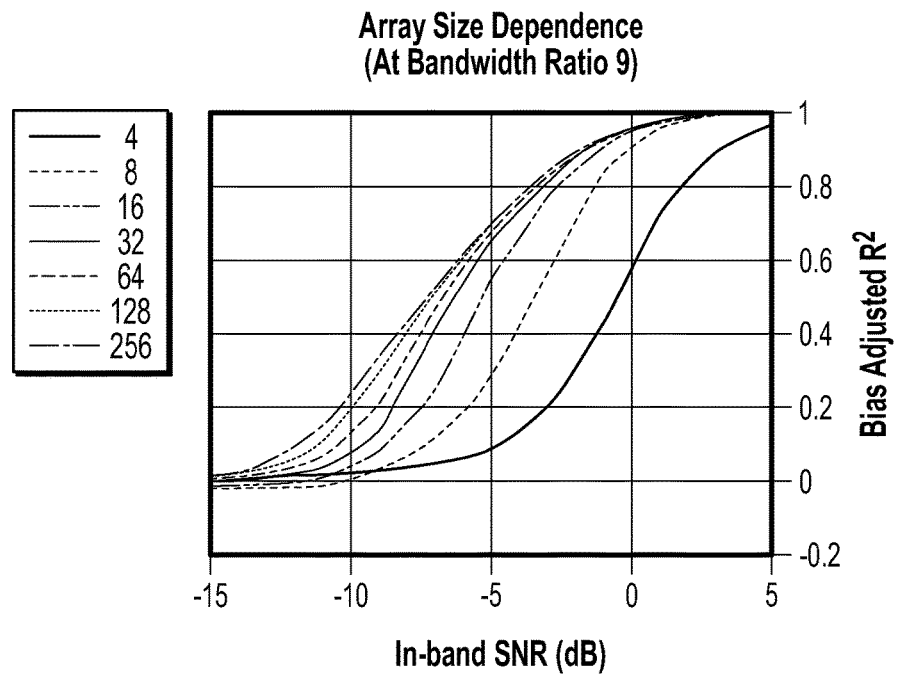

The test signals used in FIG. 2 and FIG. 3 were generated by applying a square FIR bandpass filter with a passband of 0.02 to 0.1, in units of Nyquist frequency, to windowed Gaussian white noise, where a Guassian window with a standard width of 20 samples was applied in the time domain, whose passband was normalized to unit magnitude in the frequency domain at all frequencies. The test signal was then normalized to have zero mean and unit variance; the result is a transient signal as illustrated in FIG. 2A with the desired spectral properties. 64 "records" were created by embedding the test signal at mutually random and independent delays within Gaussian noise composed of two parts: "in-band" noise was constructed with a power spectrum matching that of the test signal by filtering white noise with unit variance with the, while "out-band" noise was obtained by subtracting the in-band noise from the same white noise used to generate the former and low-pass filtering below 0.2 Nyquist units. Delays were implemented by circularly shifting each record by an amount drawn from a uniform distribution over the duration of the record. The demonstration was carried out in the circular domain for illustrative purposes, as this allows the respective finitely sampled bands to have ideal characteristics and simplifies the comparison of algorithms across conditions, which may done with circular statistics. Both in- and out-band noise were normalized to have unit variance after filtering, and the final noise signal was created from the summation of in- and out-band noise whose amplitudes were balanced over several levels: the out-band signal-to-noise ratio varied from 5 dB to −20 dB, while in-band noise varied from 5 dB to −30 dB, where decibel values refer to the ratio between total signal energy and total noise within each band, separately. 500 such test-signal arrays were generated, and the results summarizing the average performance of bispectral delay estimator are shown in FIG. 3A-B. Test signal generation and all analyses were programmed in Matlab.

ECG Test Signal

The performance of the algorithm in recovering a physiological signal from varying levels of noise was tested by adding random noise to 2 minute segments ECG obtained from the MIT-BIH normal sinus rhythm database.[24] Data were retrieved for 16 subjects, starting at sample number 10000 (00:01:18.125 to 00:02:18.125), divided into records of approximately 3-beat duration. Gaussian and Non-Gaussian noise was generated at multiple in- and out-band levels. The in-band noise was spectrum defined as $$\sigma_{in} = \frac{|Y(\omega)|^2}{|Y(\omega)|^2 + 1} \quad (64)$$

where Y is the spectrum of the input signal before adding noise, and $$\sigma_{out} = \frac{1}{|Y(\omega)|^2 + 1} \quad (65)$$

Figure 4A:
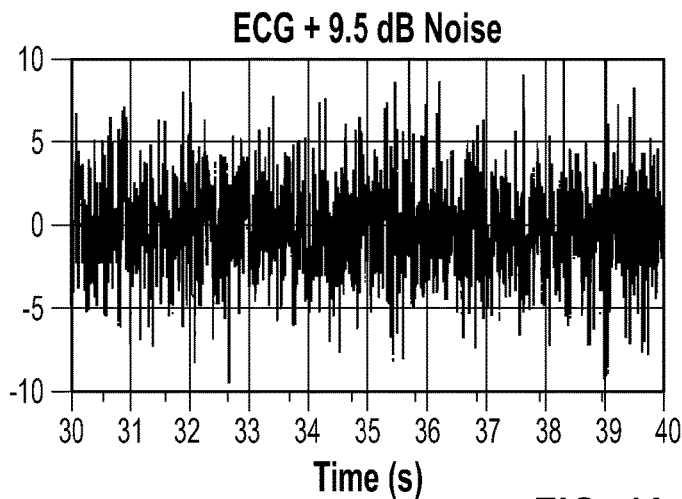
FIG. 4a-4f illustrate the blind recovery of electrocardiogram (ECG) signal under large-amplitude noise according to one embodiment of the present invention.
Figure 4B:
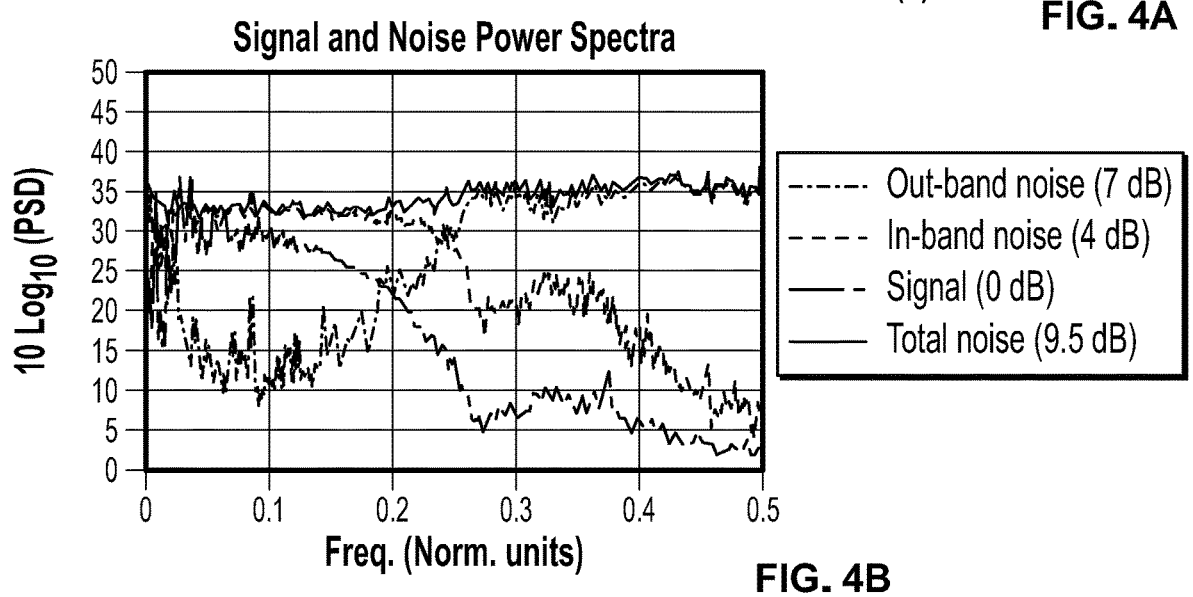
Figure 4C:
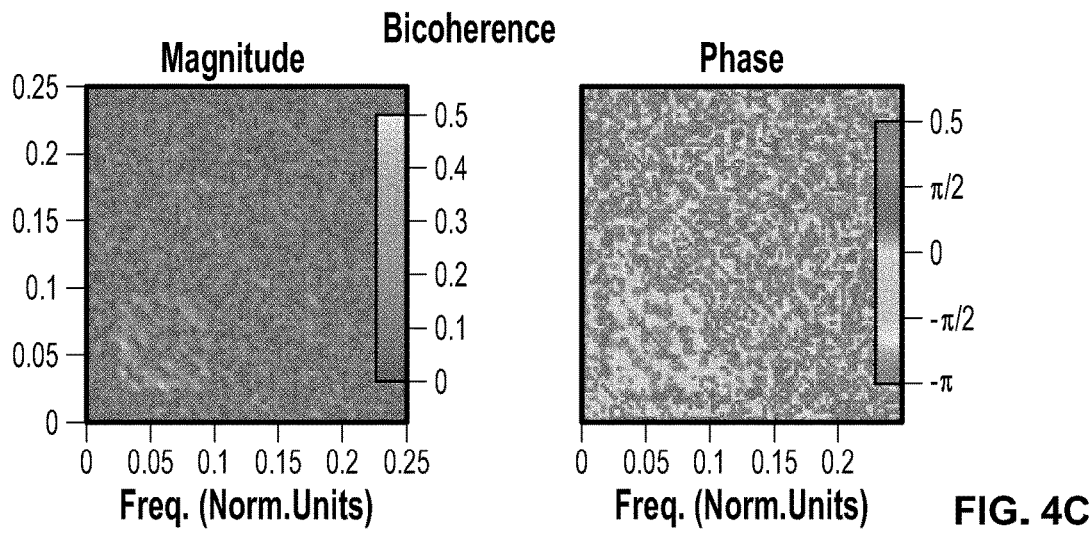
Figure 4D:
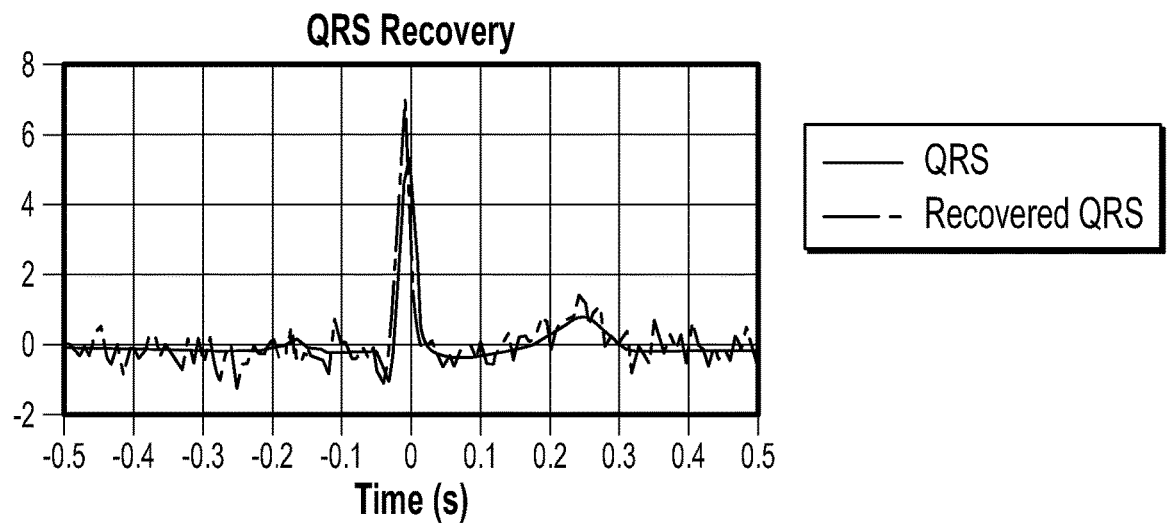
Figure 4E:
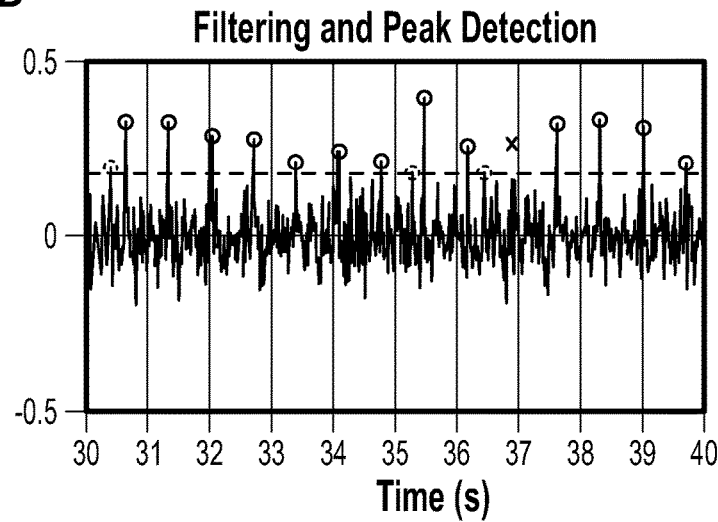
Figure 4F:
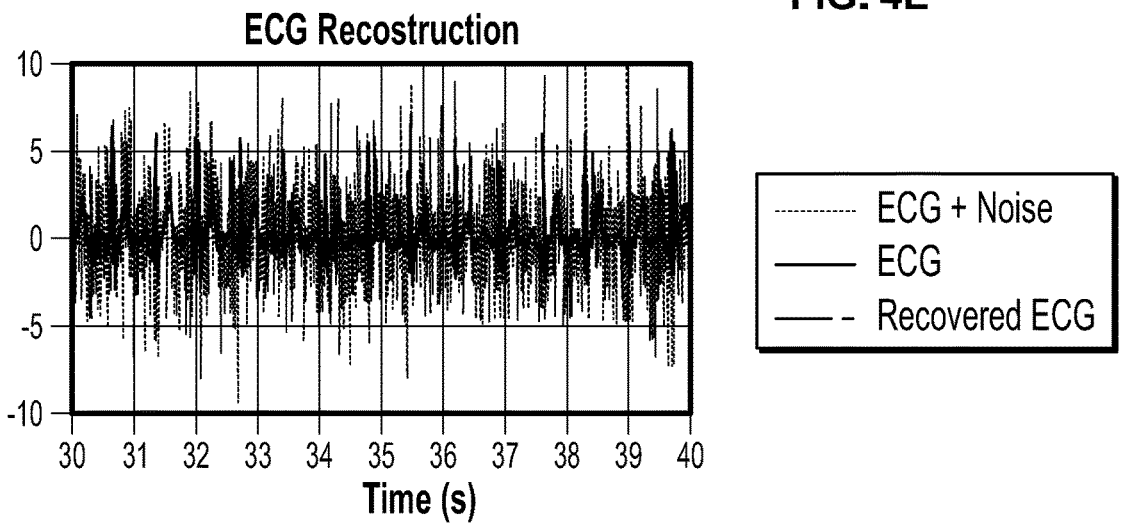
Figure 5A:
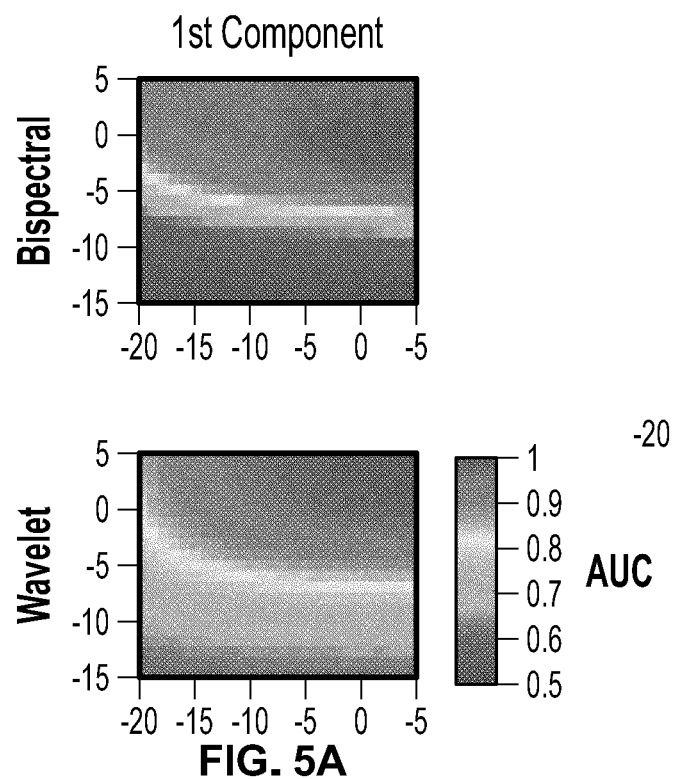
FIG. 5a-5f illustrate the comparison of the bispectral signal recovery method and a representative non-blind wavelet filtering technique under varying levels of Gaussian and non-Gaussian noise according to one embodiment of the present invention.
Figure 5B:
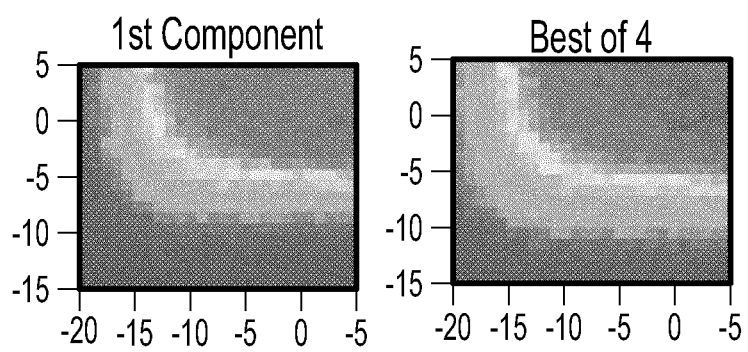
Figure 5B:
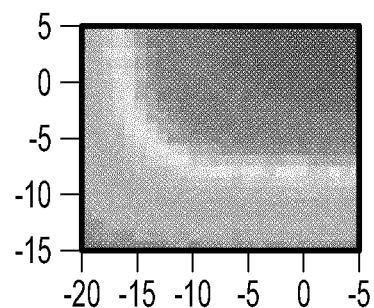
Figure 5C:
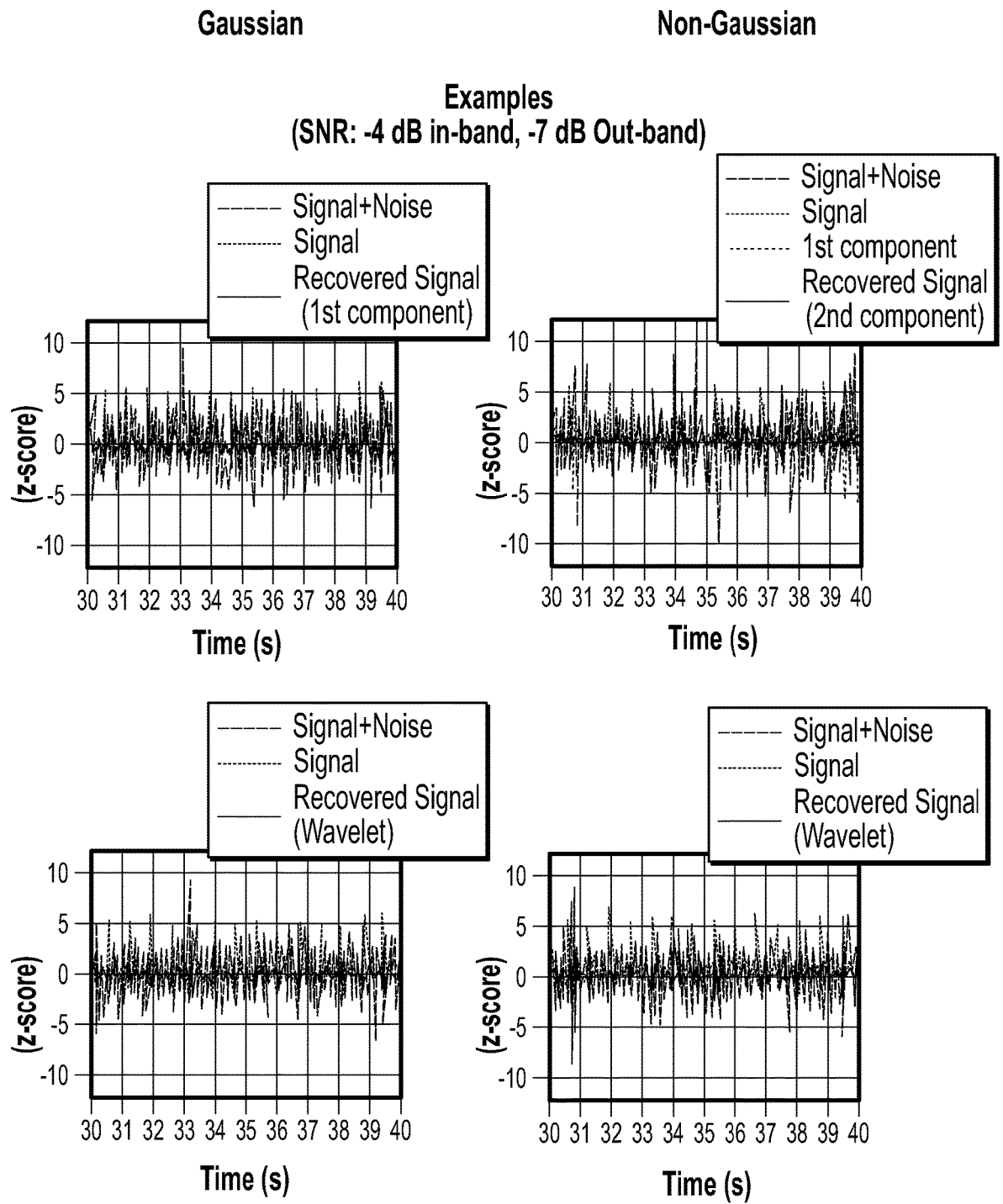
Figure 5D:
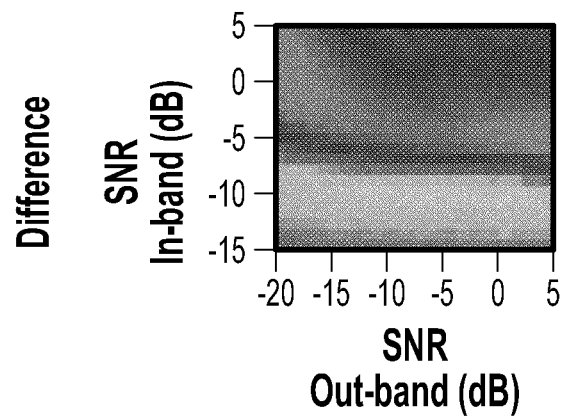
Figure 5E:
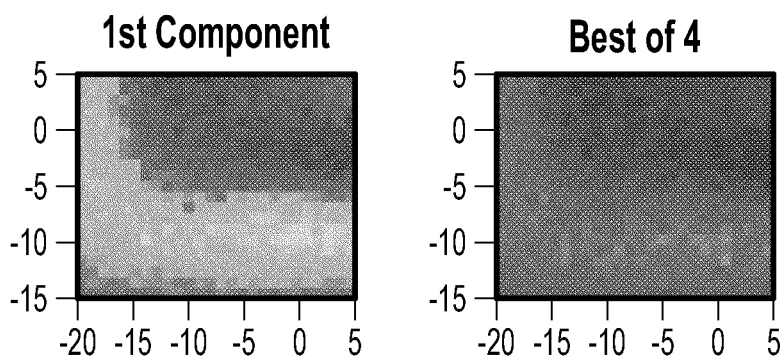
Figure 5F:
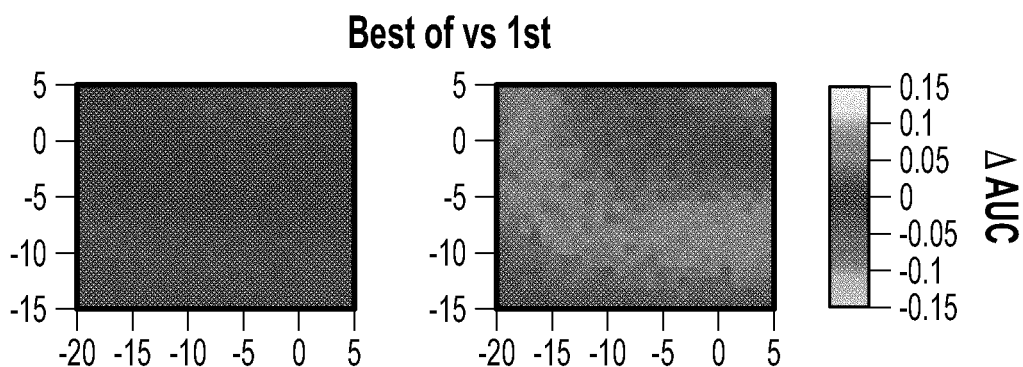

To each array of records and at each combination of in- and out-band noise, 20 random noise realizations were added. Non-Gaussian noise was generated applying a filter with amplitude response given as above to squared Gaussian white noise, whose distribution, $x^2(1)$, is highly skewed. To make the phase of resulting noise HOS independent of the signal HOS, the phase response of the filter was randomized, after which the filter function was windowed in the time domain so that the dispersion of energy in time resembled that of the zero-phase filter. Example data are displayed in FIG. 4a, while performance averaged across subjects and realizations, in comparison to a representative wavelet filter, is displayed in FIG. 5a-f.

Second-Order Delay Estimation

To compare the performance of second-order estimators to the bispectral method, pairwise delays were estimated for all records from the maximum value in respective cross correlations. An array was then constructed encoding lags for each pair of records as a phase value:

$$\Phi = \left[\exp\left(2\pi i \frac{\Delta\tau_{jk}}{N}\right)\right]_{K \times K} \quad (66)$$

where N is the record length. Given that $$E[\Phi] = \left[\exp\left(2\pi i \frac{\tau_j}{N}\right)\right]_{K \times 1} \left[\exp\left(-2\pi i \frac{\tau_k}{N}\right)\right]^T_{K \times 1} \quad (67)$$

the delays within individual records may be estimated from 4 according to the phases of the respective loadings onto the first component returned by a singular-value decomposition (SVD). Delays recovered in this way are unique up to an arbitrary constant time shift in all records, which does not affect the circular correlations used in comparing the algorithms Woody's Algorithm A variation of the cross-correlation technique, described by Woody, also served as a comparison. In general, we observed that the aforementioned SVD technique gave qualitatively similar results to Woody's algorithm, with Woody's algorithm slightly more robust to in-band noise.

Results for the Test Signal

The performance of the algorithm was demonstrated and compared to alternative cross-spectral techniques with arrays of randomly delayed test-signals embedded in Gaussian noise. As described in section previously, the test signals were designed to have flat spectra within a passband between 0.02 to 0.1 in units of Nyquist frequency. As summarized in {\bf FIG. 3a-b, the bispectral algorithm dramatically outperforms delay estimation based on pairwise cross-spectra when the signal power-spectrum cannot be estimated in the average over records. To illustrate this point, noise was varied separately in two bands: the first, "in-band noise," was designed to have a power spectrum which matched that of the signal and the second "out-band noise," had the complementary spectrum. Because the total signal-plus-noise power happens to match the signal-only power for in-band noise, the example is here contrived so that the bispectral algorithm should not greatly outperform the cross-spectral approach for a signal corrupted by in-band noise alone. A different outcome is expected for out-band noise because the cross-spectral approach fails to correctly reconstruct the signal spectrum. FIG. 3a compares the performance of the respective algorithms with the correlation between the true signal and signal estimates recovered from the delay-compensated averages. As expected, the cross-spectral delay estimation fails when out-band noise is high, with performance diminishing between −5 to −10 dB. In stark contrast, the bispectral algorithm shows virtually no decrement with increasing out-band noise, implying that the algorithm has no trouble distinguishing the signal even when noise energy in the out-band exceeds that of the signal by a hundred fold. It should be reemphasized that no prior information about the signal spectrum is provided to either algorithm; the bispectral filter therefore manages to discover the signal-containing bandwidth entirely on its own. In this example, the separation of noise energy into in-band and out-band, with the former perfectly matched to the signal power spectrum and the latter orthogonal to it is intended to illustrate a key point. The larger relevance of the example lies in demonstrating that the algorithm identifies regions of the spectrum where signal-to-noise ratio is greatest with no prior information about the signal.

Results for Recovery of ECG from Gaussian Noise

To show that the properties illustrated with artificial test signals in the previous section translate to settings more relevant to the real world, a similar analysis was conducted on two-minute segments of ECG recording obtained from the MIT-BIH database.[24] Results summarized in FIG. 4a-f demonstrate the ability of the algorithm to recover the cardiac QRS complex from extremely noisy data, according with what was observed for the artificial test case.

Results for recovery of ECG from Gaussian Noise

To demonstrate the application of the bispectral decomposition technique towards recovery of signal from non-Gaussian noise we repeated the noise test with non-Gaussian noise obtained by applying filters with the same amplitude response as in the previous case to squared non-Gaussian noise, whose distribution is Because HOS preserve information about the phase response of the filter, it is also necessary to randomize the phase response to avoid making the test overly specific to some particular filter. For example, it will be more or less difficult to discriminate the signal depending on its similarity to the noise. The phase response was therefore randomized, but also smoothed to preserve the approximate time window of the zero-phase filter, so that deterministic filter HOS remained smooth at a similar scale as the signal. The results of this test are compared to those with Gaussian noise in 5a-f. As expected, the performance of the algorithm is degraded compared to the case with Gaussian noise, but it continues to fare well next to the wavelet filter, performing comparably at most signal-to-noise levels. This remains an impressive feat, given that the wavelet filter is tailored to the detection of ECG signals. It also serves as a proof of principle that HOS allow for a decompositional approach to denoising and signal separation.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

EXAMPLES

Example 1

Implementation of Method in Hardware.

The method, as described in the present technique or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present technique.

The computer system comprises a computer, an input device, a display unit and/or the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

Figure 7:
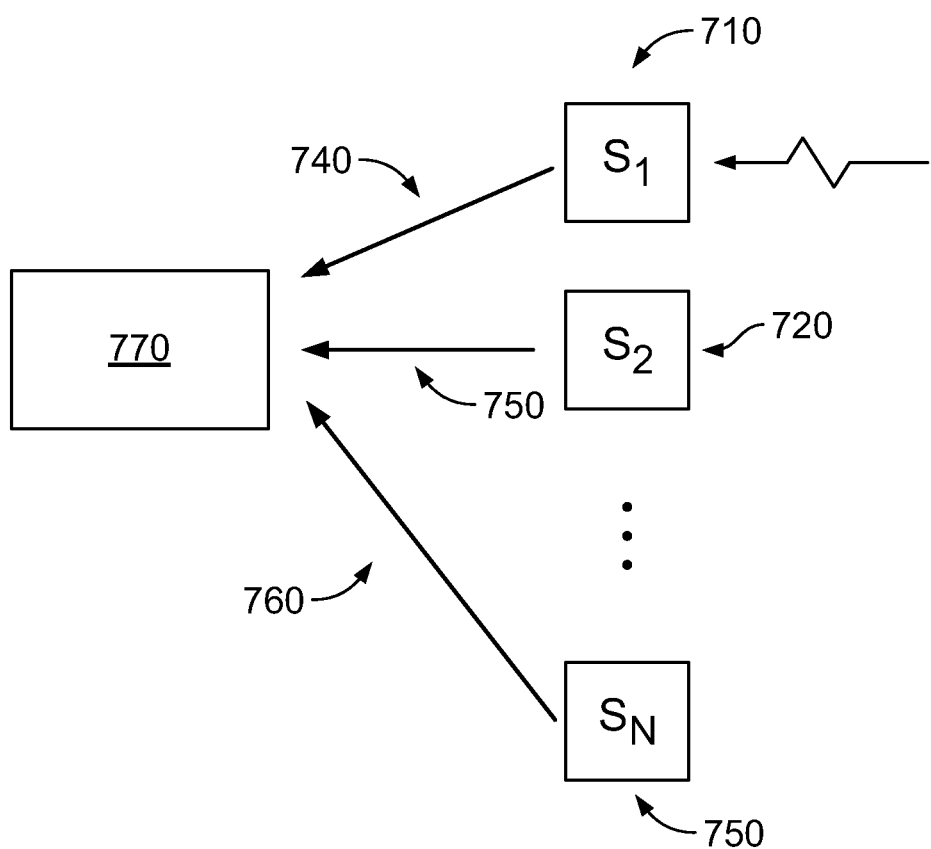
FIG. 7 illustrates a system utilizing the present teachings of the invention.

In this example, the reader is referred to FIG. 1 and FIG. 7 where a system utilizing the present teachings of the invention are illustrated. The system comprises at least one sensor 710 for receiving a record 20. As may be seen, there may be multiple sensors 720 and 730. Sensors 710, 720, and 730 may receive the record 20 from an individual sensor 710 or any combination of sensors 710, 720, and 730. It should be appreciated that the number of sensors will be application specific and that each sensor 710, 720 and 730 may be the same or different. The sensors may be configured in either a mesh network or in an ad-hoc network or may just be independent sensors and not be configured in a network configuration. Sensors 710, 720 and 730 may be solid state sensors or any other type of sensor know in the sensing arts for individuals or signal processing. Sensors 710, 720 and 730 communicate with computer 770 via any known mode of communication. For example, communication may be achieved via Bluetooth®, the Internet, an intranet, local area network (LAN), low powered wireless network, wide area network (WAN), or directly wired to computer 770. Each sensor 710, 720 and 730 may have respective signal delay(s) $T_d$ 40 associated with record 20 and embedded signal of interest 10.

Computer 770 receives record 20 and processes record 20 as described below. It should be appreciated that record 20 may be stored in computer 770 as a data record in a database. These data records may be processed by database management system (DBMS) as conventional database records for storage purposes. Records 20 in computer 770 may be stored on a data storage medium or data storage device such as, but not limited to: machine-readable medium, non-transient storage medium, read-only memory (ROM), or storage medium(s).

Computer 770 has computer software to form a computer system. The computer software is provided for implementing the inventive concepts on record 20 to recover the signal of interest 10 from the Gaussian noise 30 in record 20.

Figure 8:
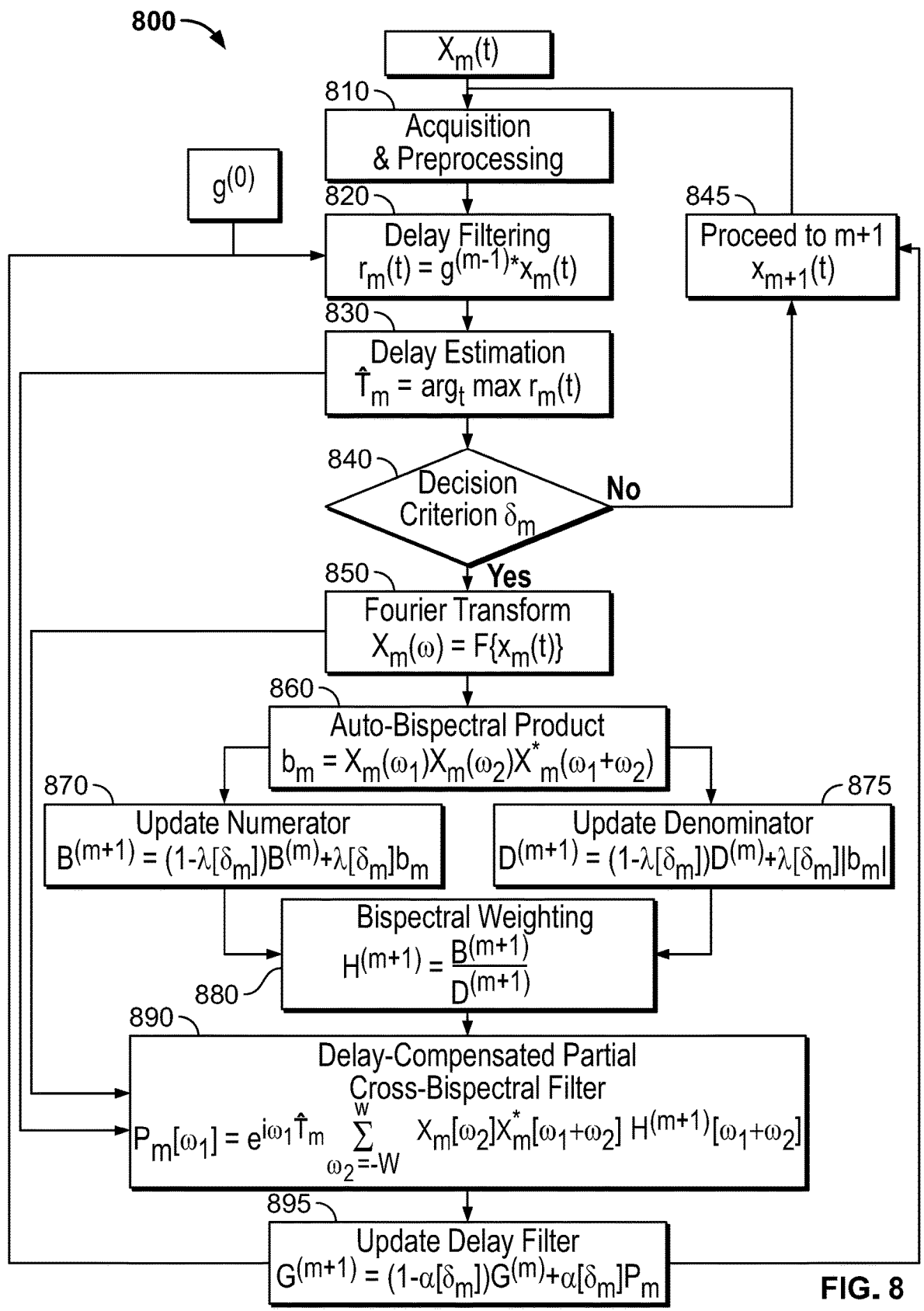
FIG. 8 illustrates the steps associated with executing the teachings of the present invention.

Turning now to FIG. 8, the steps associated with executing the teachings of the present invention. It should be appreciated that there are two cases, the first case is where we are gathering each record as we implement the teachings of the invention, i.e. real-time and the second case where we have gathered all the records and are utilizing the teachings of the invention as a batch process. For the discussion below, we will address the first case i.e. real-time processing. It should be appreciated that numerous records 20 will be collected in the real-time scenario and as way of example we will describe the process of two sequential records, i.e. a steady state of collecting records. The inventive method 800 starts with computer 770 receiving a data record from sensor 710 and is illustrated as step 810. A detection filter $g^{(m)}$ is applied to the record, illustrated in step 820:

$$r_m(t) = g^{(m-1)} * x_m(t) \tag{68}$$

and the maximum value between $T_x$ and $T_y$ is identified as the estimated delay of signal 10 within record m, illustrated in step 830:

$$\hat{\tau}_m = \underset{t}{\arg\max} r_m(t) \tag{69}$$

Next, a decision criterion is applied to the output of the filter to obtain a decision parameter, $\delta_m$, illustrated in step 840, which may determine whether the record is used to update the delay filter, $y^{(m)}$ for example, the criterion may take the form of a detection threshold on the value of $r_m(\hat{\tau}_m)$. Alternatively, the criterion may include all records, or may depend on the record number, m, such that the filter is updated at some predetermined schedule, or may exclude all records so that the filter remains at its initial state, $r^{(0)}$. If the criterion is not met, then the algorithm proceeds to the next record. If the criterion is met, the spectrum for record 20 is computed as illustrated in step 850. This may be accomplished by computing a fast Fourier transform (FFT) on record (20):

$$X_m(\omega) = \mathscr{F}\{x_m(t)\} \tag{70}$$

Alternatively, step 850 may be implemented as a bank of single-sideband quadrature filters with suitably spaced center frequencies. Next, as illustrated in 860, the products of the spectrum at all triplets of frequencies which sum to zero are computed within a desired range:

$$b_m = X_m(\omega_1) X_m(\omega_2) X_m^*(\omega_1 + \omega_2) \tag{71}$$

The value of the spectrum at a negative frequency is here understood to be the complex conjugate of the value of the spectrum at the corresponding positive frequency. The result of step 860 is incorporated into separate running averages of two values: the first, illustrated in 870 is a running-average estimate of the observed bispectrum:

$$B^{(m+1)} = (1 - \lambda[\delta_m]) B^{(m)} + \lambda[\delta_m] b_m \tag{72}$$

and the second, illustrated in 875, is the running-average magnitude of bispectral products:

$$D^{(m+1)} = (1 - \lambda[\delta_m]) D^{(m)} + \lambda[\delta_m] b_m \tag{73}$$

where $\lambda[\delta_m]$ is a learning rate in the range,$^{0,1}$ which may depend on the decision parameter, $\delta_m$. The present embodiment uses amplitude-weighted normalization in step 875; alternatively, any of the other normalization schemes described previously might be used. Next, in step 880, the weighting, H, is calculated for a bispectral filter by computing the ratio of values obtained in 870 and 875 using equation 74, below.

$$H^{(m+1)} = \frac{B^{(m+1)}}{D^{(m+1)}} \tag{74}$$

Next, in step 890, a linear filter, the "delay-compensated partial cross-bispectral filter" for record m is computed as:

$$P_m[\omega_1] = e^{i\omega_1 \hat{\tau}_m} \sum_{\omega_2=-W}^{W} X_m[\omega_2] X_m^*[\omega_1 + \omega_2] H^{(m+1)}[\omega_1, \omega_2] \tag{75}$$

As illustrated in 895, the filter obtained in step 890 is then used to update the detection filter, G, using equation 76, below:

$$G^{(m+1)} = (1 - \alpha[\delta_m]) G^{(m)} + \alpha[\delta_m] P_m \tag{76}$$

where $\alpha[\delta_m]$ is a learning rate within, $^{0,1}$ which may depend on decision parameter, $\delta_m$. Steps 810 through 895 are repeated for the next record 20 using the updated detection filter in step 820.

Generalizations for Complex and Multivariate Signals

The present algorithm generalizes to complex and multivariate signals with little difficulty. The models underlying these extensions assume that m component signals each contain a distinct feature which manifests with relative timing fixed across components in a background of possibly correlated stationary noise. Because complex signals are isomorphic to bivariate real signals, the multivariate extension applies to univariate complex signals as well. In both cases the extension entails the application of separate windows, H, to auto- and cross-spectra, which optimally accounts for the correlation structure of the noise both within and across the component signals.

For a multivariate signal, $x(t) \in R^m$, our model supposes that distinct transient features appear within the component signals with fixed relative timing in a background of correlated Gaussian noise:

$$x(t) = [x_1(t), \ldots, x_m(t)] = f(t-\tau) + n(t-\tau) \quad (77)$$
$$= [f_1(t-\tau), \ldots, f_m(t-\tau)] + [n_1(t), \ldots, n_m(t)]$$

where $f(t) \in R^m$ is the set of features appearing in the respective components and $n(t) \in N^m$ is Gaussian noise with cross spectrum $E[N^*(\omega)N^T(\omega)] = \Sigma(\omega) = [\sigma_{ij}(\omega)]_{m \times m}$. We wish to find a set of filters $h = [h_1 \ldots, h_m]$, whose combined output, $$r(t) = \sum_{j=1}^{m} h_j * x_j(t) \quad (78)$$

yields a minimally perturbed peak at $\tau$.

The argument is developed in the same way as in the above paragraphs. In place of Eq. (9) we have $$E[r''(\tau)] = \int \omega^2 \sum_{i=1}^{m} F_i(\omega) H_i(\omega) d\omega = \int \omega^2 F^T H(\omega) d\omega \quad (79)$$

while the presence of correlated noise implies that (11) becomes $$E[(r'(\tau))^2] = \quad (80)$$
$$\int \omega^2 \sum_{i=1, j=1}^{m} \sigma_{ij}(\omega) H_i(\omega) H_j^*(w) d\omega = \int \omega^9 H^T \Sigma H^*(w) d\omega$$

The multivariate matched filter is found by substituting (79) and (80) into the Lagrangian function (12) and completing the square, as was done in (13):

$$H(\omega) = \Sigma^{-1} F^*(\omega) \quad (81)$$

for $\omega \neq 0$.

In applying the argument to the bispectral delay estimator, (27) generalizes as $$r_{122}(t) = \sum_{\{j_1, j_2, j_3\}} \int X_{1j_1}(\omega_1) e^{i\omega_1 t} \quad (82)$$
$$\int X_{2j_2}(\omega_2) X_{2j_3}^*(\omega_1 + \omega_2) H_{\{j_1, j_2, j_3\}}(\omega_1, \omega_2) d\omega_2 d\omega_1$$

whose expected squared derivative, following (29), becomes $$E[(r'_{122}(\Delta\tau_{12}))^2] \leq \quad (83)$$
$$A^2 \int \omega_1^2 \sum_{\{i_1, i_2, i_3\}} \sum_{\{j_1, j_2, j_3\}} E[XX_{1i_1 j_1}^*(\omega_1) XX_{2i_2 j_2}^*(\omega_2)$$
$$XX_{2i_3 j_3}^*(\omega_1 + \omega_2)] \times H_{i_1 i_2 i_3}^* H_{j_1 j_2 j_3}^*(\omega_1, \omega_2) d\omega_2 d\omega_1$$

where $XX_{abc}^*(\omega)$ is shorthand for $X_{ab}(\omega) X_{ac}^*(\omega)$.

Eq. (28) generalizes as $$E[r''_{122}(\Delta\tau_1 2)] = -\int \omega_1^2 \sum_{\{j_1, j_2, j_3\}} F_{j_1}(\omega_1) \quad (84)$$
$$\int F_{j_2}(\omega_2) F_{j_3}^*(\omega_1 + \omega_2) H_{j_1 j_2 j_3}(\omega_1, \omega_2) d\omega_2 d\omega_1$$

The Lagrangian (12) reduces, as before, to an easily solved quadratic form, which is minimized at $$H(\omega_1, \omega_2) = D^{-1}(\omega_1, \omega_2) [F(\omega_1) \otimes F(\omega_2) \otimes F^*(\omega_1 + \omega_2)] \quad (85)$$

where $\otimes$ is the Kronecker product, $H = [H_{\{j_1, j_2, j_3\}}]_{3^K \times 3^K \times 1}$ $$D = E[[XX_{1i_1 j_1}(\omega_1) XX_{2i_2 j_2}(\omega_2) XX_{2i_3 j_3}(\omega_1 + \omega_2)]_{3^K \times 3^K}] \quad (86)$$

In the case when n is a strictly Gaussian noise process, with cross-spectral density matrix $\Sigma(\omega)$ $$D(\omega_1, \omega_2) = \Sigma(\omega_1) \otimes \Sigma(\omega_2) \otimes \Sigma(\omega_1 + \omega_2) \quad (87)$$

where $\Sigma(\omega) = \Sigma_n(\omega) + F^* F^T(\omega)$. These results generalize directly to HOS of arbitrary order, K, with $$H_{m^K \times 1}(\omega_1, \ldots, \omega_{K-1}) = \quad (88)$$
$$D_{m^K \times m^K}^{-1}(\omega_1, \ldots, \omega_{K-1}) \left[ F(\omega_1) \otimes \ldots \otimes F(\omega_{K-1}) \otimes F^* \left( \sum_{k=1}^{K-1} \omega_k \right) \right]$$

and $$D(\omega_1, \ldots, \omega_{K-1}) = \Sigma(\omega_1) \otimes \ldots \otimes \Sigma(\omega_{K-1}) \otimes \Sigma \left( \sum_{k=1}^{K-1} \omega_k \right)$$

for Gaussian noise.

Filter estimation follows from a similar generalization of the univariate algorithm. The complete set of $\binom{m+2}{m-1}$ $3^{rd}$-order auto and cross spectral estimators, $\hat{M}$, provide an estimate of $[F(\omega_1) \otimes F(\omega_2) DF^*(\omega_1 + \omega_2)]$:

$$\hat{M}_{\{j_1, j_2, j_3\}}(\omega_1, \omega_2) \to F_{j_1}(\omega_1) F_{j_2}(\omega_2) F_{j_3}^*(\omega_1 + \omega_2) \quad (89)$$

while D may be estimated as a generalization of the numerator in bicoherence:

$$\hat{D}_{\{j_1, j_2, j_3\}}^{\{i_1, i_2, i_3\}} = \sigma_{i_1 j_1}(\omega_1) < XX_{2j_2}^*(\omega_2)$$
$$XX_{i_3 j_3}^*(\omega_1 + \omega_2) > \quad (90)$$

or from the cross spectral density matrix under the assumption of Gaussian noise $$\hat{D}_{U_1,U_2,U_3}^{\{i_1,i_2,i_3\}} = \sigma_{i_1 j_1}(\omega_1)\sigma_{i_2 j_2}(\omega_2)\sigma_{i_3 j_3}(\omega_1+\omega_2) \quad (91)$$

$\hat{H}$ is obtained by substituting $\hat{D}$ and $\hat{M}$ into Eq. (88). These equations generalize directly to HOS of arbitrary order, for which the full set of interactions involve $\binom{K+m-1}{m-1}$ spectra.

Next, a detection filter is obtained for the $i^{th}$ component through a summation of Eq. (75) over all spectra in which i is the first component:

$$G_i^{(v+1)} = \frac{1}{L}\sum_{t=1}^{L} e^{i\omega_1 \hat{\tau}_l^{(v)}} \sum_{j=1,k=1}^{m} \sum_{\omega_2=-W}^{W} X_{lj}[\omega_2] X_{lk}^*[\omega_1+\omega_2]\hat{H}_{ijk}[\omega_1,\omega_2] \quad (92)$$

Finally, the delay is estimated for the VII record by summing the respective filter outputs over all components, and the algorithm proceeds to the next iteration:

$$\hat{\tau}_l^{(v+1)}(t) = \hat{\tau}_l^{(v)} + \underset{t}{\mathrm{argmax}}\left[\sum_{j=1}^{m} g_j^{(v)} * x_j(t+\hat{\tau}_l^{(v)})\right] \quad (93)$$

Note that the delay, $\tau_l$, is necessarily assumed to be the same across all component signals in the $l^{th}$ record, but any relative offset of the delay between components, which remains fixed over records, will be reflected in the linear phase of the respective filters, and thus poses no limitation.

The computational complexity of estimating all non-redundant spectra grows as $M^3$ with the number of variates. This cubic growth of complexity may be addressed by estimating only a subset of the spectra. For example, one might include only the m auto-spectra in filter estimation, which is appropriate for uncorrelated noise. Otherwise one might restrict estimation to the $m^2$ auto- and pairwise cross-spectral interactions.

Applications to univariate complex signals, $y^{(i)} \in \mathbb{C}^1$, may proceed by formulating an equivalent bivariate real problem, $[x+,x-]^T \in \mathbb{R}^2$ where the real-valued component signals are $$x_+(t) = \frac{1}{2}(\mathrm{Re}\{y\} - \mathscr{H}\{Im\{y\}\}) \quad (94)$$

$$x_-(t) = \frac{1}{2}(\mathrm{Re}\{y\} + \mathscr{H}\{Im\{y\}\})$$

where $\mathscr{H}$ is the Hilbert transform. The preceding development for multivariate signals applies directly in this formulation.

REFERENCES

The following references are referred to above and are incorporated herein by reference:
1. G. C. Carter, "Coherence and time delay estimation," *Proceedings of the IEEE*, vol. 75, no. 2, pp. 236-255, 1987.
2. G. Turin, "An introduction to matched filters," IRE *Transactions on Information Theory*, vol. 6, no. 3, pp. 311-329, June 1960.
3. C. D. Woody, "Characterization of an adaptive filter for the analysis of variable latency neuroelectric signals," *Medical and biological engineering*, vol. 5, no. 6, pp. 539-554, November 1967. [Online]. Available: https://doi.org/10.1007/BF02474247=0 pt
4. D. R. Brillinger, "An introduction to polyspectra," *The Annals of mathematical statistics*, pp. 1351-1374, 1965.
5. J. M. Mendel, "Tutorial on higher-order statistics (spectra) in signal processing and system theory: theoretical results and some applications," *Proceedings of the IEEE*, vol. 79, no. 3, pp. 278-305, March 1991.
6. C. L. Nikias and J. M. Mendel, "Signal processing with higher-order spectra," *IEEE signal processing magazine*, vol. 10, no. 3, pp. 10-37, 1993.
7. M. J. Hinich and G. R. Wilson, "Time delay estimation using the cross bispectrum," *IEEE Transactions on Signal Processing*, vol. 40, no. 1, pp. 106-113, January 1992.
8. C. L. Nikias and R. Pan, "Time delay estimation in unknown gaussian spatially correlated noise," *IEEE Transactions on Acoustics, Speech, and Signal Processing*, vol. 36, no. 11, pp. 1706-1714, 1988.
9. A. V. Totsky, A. A. Zelensky, and V. F. Kravchenko, *Bispectral methods of signal processing: applications in Radar, telecommunications and digital image restoration.* plus 0.5em minus 0.4emWalter de Gruyter GmbH & Co KG, 2015.
10. C. K. Kovach, H. Oya, and H. Kawasaki, "The bispectrum and its relationship to phase-amplitude coupling," *NeuroImage*, vol. 173, pp. 518539, 2018. [Online]. Available: http://www.sciencedirect.com/science/article/pii/S1053811918301307=0 pt
11. L. A. Pflug, G. E. Ioup, J. W. Ioup, K. H. Barnes, R. L. Field, and G. H. Rayborn, "Detection of oscillatory and impulsive transients using higher-order correlations and spectra," *The Journal of the Acoustical Society of America*, vol. 91, no. 5, pp. 2763-2776, 1992. [Online]. Available: https://doi.org/10.1121/1.402957=0 pt
12. L. A. Pflug, G. E. Ioup, J. W. Ioup, R. L. Field, and J. H. Leclere, "Time-delay estimation for deterministic transients using second- and higher-order correlations," *The Journal of the Acoustical Society of America*, vol. 94, no. 3, pp. 1385-1399, 1993. [Online]. Available: https://doi.org/10.1121/1.408167=0 pt
13. L. A. Pflug, G. E. Ioup, J. W. Ioup, and R. L. Field, "Prediction of signal-to-noise ratio gain for passive higher-order correlation detection of energy transients," *The Journal of the Acoustical Society of America*, vol. 98, no. 1, pp. 248-260, 1995. [Online]. Available: https://doi.org/10.1121/1.414332=0 pt
14. R. A. Wiggins, "Minimum entropy deconvolution," *Geoexploration*, vol. 16, no. 1, pp. 2135, 1978. [Online]. Available: http://www.sciencedirect.com/science/article/pii/0016714278900054=0 pt
15. J. A. Cadzow, "Blind deconvolution via cumulant extrema," *IEEE Signal Processing Magazine*, vol. 13, no. 3, pp. 24-42, May 1996.
16. P. Paajarvi and J. P. LeBlanc, "Online adaptive blind deconvolution based on third-order moments," *IEEE Signal Processing Letters*, vol. 12, no. 12, pp. 863-866, December 2005.
17. M. K. Broadhead, L. A. Pflug, and R. L. Field, "Use of higher order statistics in source signature estimation," *The Journal of the Acoustical Society of America*, vol. 107, no. 5, pp. 2576-2585, 2000. [Online]. Available: https://doi.org/10.1121/1.428645=0 pt
18. X. Li and N. M. Bilgutay, "Wiener filter realization for target detection using group delay statistics," *IEEE Transactions on Signal Processing*, vol. 41, no. 6, pp. 2067-2074, June 1993.

19. Y. C. Kim and E. J. Powers, "Digital bispectral analysis and its applications to nonlinear wave interactions," *IEEE Transactions on Plasma Science*, vol. 7, no. 2, pp. 120-131, June 1979.
20. S. Hagihira, M. Takashina, T. Mori, T. Mashimo, and I. Yoshiya, "Practical issues in bispectral analysis of electroencephalographic signals," *Anesthesia & Analgesia*, vol. 93, no. 4, pp. 966-970, 2001.
21. C. K. Kovach, "A biased look at phase locking: Brief critical review and proposed remedy," *IEEE Transactions on Signal Processing*, vol. 65, no. 17, pp. 4468-4480, 2017.
22. D. L. Donoho and I. M. Johnnstone, "Ideal denoising in an orthonormal basis chosen from a library of bases," *Comptes rendus de l'Academie des sciences. Série 1, Mathématique*, vol. 319, no. 12, pp. 1317-1322, 1994.
23. B. Matthews, "Comparison of the predicted and observed secondary structure of t4 phage lysozyme," *Biochimica et Biophysica Acta (BBA)—Protein Structure*, vol. 405, no. 2, pp. 442451, 1975. [Online]. Available: http://www.sciencedirect.com/science/article/pii/0005279575901099=0 pt
24. A. L. Goldberger, L. A. N. Amaral, L. Glass, J. M. Hausdorff, P. C. Ivanov, R. G. Mark, J. E. Mietus, G. B. Moody, C.-K. Peng, and H. E. Stanley, "Physiobank, physiotoolkit, and physionet," *Circulation*, vol. 101, no. 23, pp. e215e220, 2000. [Online]. Available: http://circ.ahajournals.org/content/101/23/e215=0 pt All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of processing a signal of interest, comprising the steps of:
   receiving a data record having a period from $T_0$ to $T_n$ and containing a signal of interest disposed between $T_0$ and $T_n$, the signal of interest having a lag $T_d$ from $T_0$ and a maximum value between $T_x$ and $T_y$;
   computing bispectral statistics on the data record;
   generating a weighting H for a bispectral filter;
   calculating a linear filter G;
   applying linear filter G to the data record at the peak power of the signal of interest; and
   aligning the signal of interest to prior signals of interest with respect to respective time delays $T_{dS}$.
2. The method recited in claim 1, wherein the data record is windowed into windowed data record $X_j$.
3. The method recited in claim 2 wherein each windowed data record $X_j$ contains a portion of the signal of interest.
4. The method recited in claim 2 wherein each windowed data record $X_j$ is the same size.
5. The method recited in claim 2 wherein at least one windowed data $X_j$ record is of a different size than the at least one windowed data record $X_{j+N}$.
6. The method recited in claim 1 wherein the data record is divided into observation windows.
7. The method recited in claim 6 wherein the observation windows are the same size.
8. The method recited in claim 6 wherein at least one observation widow is a different size from the rest.
9. The method recited in claim 1 wherein the signal of interest is a single instance disposed between $T_0$ and $T_n$.
10. The method recited in claim 1 wherein there are multiple sensors for generating respective data records and having a period from $T_0$ to $T_n$ and containing a signal of interest disposed between $T_0$ and $T_n$, the signal of interest having a respective lag $T_d$ from $T_0$.
11. The method of claim 10 wherein there is noise in at least two respective data records.
12. The method of claim 1 wherein the linear filter G is defined by:

$$G = \frac{1}{K} \sum_{\omega_2=-W}^{W} \sum_{j=1}^{K} X_j[\omega_2] X_j^*[\omega_1 + \omega_2] \hat{H}[\omega_1, \omega_2].$$

13. The method of claim 1 wherein the weighting H is defined by:

$$\hat{H}[\omega_1 \omega_2] = K \frac{\sum_{k=1}^{K} X_k[\omega_1] X_k[\omega_2] X_k^*[\omega_1 + \omega_2]}{\sum_{i=1}^{K} |X_i[\omega_1]|^2 \sum_{j=1}^{K} |X_k[\omega_2] X_k^*[\omega_1 + \omega_2]|^2}.$$

14. The method of claim 1 wherein the aligning step is conducted by the following iteration:

$$G^{(m+1)} = \frac{1}{K} \sum_{j=1}^{K} e^{i\omega_1 \tau_j^{(m)}} \sum_{\omega_2=-W}^{W} X_j[\omega_2] X_j^*[\omega_1 + \omega_2] \hat{H}[\omega_1, \omega_2].$$

15. A method of processing a signal of interest, comprising the steps of:
   receiving a data record having a period from $T_0$ to $T_n$ and containing a signal of interest disposed between $T_0$ and $T_n$, the signal of interest having a lag $T_d$ from $T_0$ and a maximum value between $T_x$ and $T_y$;
   computing bispectral statistics on the data record;
   generating a weighting H for a bispectral filter;
   calculating a linear filter G;
   applying linear filter G to the data record;
   determining the time delay, $T_d$, from the maximum value within the filtered record;
   and aligning the signal of interest to prior signals of interest with respect to respective time delays $T_{dS}$;
   wherein the weighting H is defined by:

$$H^{(m+1)} = \frac{B^{(m+1)}}{D^{(m+1)}};$$

wherein the numerator of H is defined by:

$$B^{(m+1)} = (1-\lambda[\delta_m])B^{(m)} + \lambda[\delta_m]b_m;$$

wherein the denominator of H is defined by:

$$D^{(m+1)} = (1-\lambda[\delta_m])D^{(m)} + \lambda[\delta_m]b_m;$$

wherein the bispectral product for record m is defined by:

$$b_m = X_m(\omega_1)X_m(\omega_2)X_m^*(\omega_1+\omega_2).$$

16. The method of claim 15 wherein the aligning step is conducted by the following iteration:

$$G^{(m+1)} = (1-\alpha[\delta_m])G^{(m)} + \alpha[\delta_m]P_m;$$

wherein the delay-compensated partial cross-bispectral filter for record m is $$P_m[\omega_1] = e^{i\omega_1 \tau_m} \sum_{\omega_2=-W}^{W} X_m[\omega_2]X_m^*[\omega_1+\omega_2]H^{(m+1)}[\omega_1, \omega_2].$$

17. The method recited in claim 15 wherein the data record is divided into observation windows.

18. The method recited in claim 17 wherein the observation windows are the same size.

19. The method recited in claim 17 wherein at least one observation widow is a different size from the rest.

20. The method recited in claim 15 wherein there are multiple sensors for generating respective data records and having a period from $T_0$ to $T_n$ and containing a signal of interest disposed between $T_0$ and $T_n$, the signal of interest having a respective lag $T_d$ from $T_0$.

\* \* \* \* \*